(12) United States Patent
Dontcheva et al.

(10) Patent No.: US 9,577,897 B2
(45) Date of Patent: Feb. 21, 2017

(54) PROVIDING VISUALIZATIONS OF EVENT SEQUENCE DATA

(71) Applicant: Adobe Systems Incorporated, San Jose, CA (US)

(72) Inventors: Lubomira Dontcheva, San Francisco, CA (US); Jian Zhao, Toronto (CA); Aaron Hertzmann, San Francisco, CA (US); Alan Wilson, Cedar Hills, UT (US); Zhicheng Liu, Redwood City, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 150 days.

(21) Appl. No.: 14/627,179

(22) Filed: Feb. 20, 2015

(65) Prior Publication Data

US 2016/0248644 A1    Aug. 25, 2016

(51) Int. Cl.
*H04L 12/26* (2006.01)
*H04L 29/08* (2006.01)
*G06T 11/20* (2006.01)
*G06T 11/60* (2006.01)

(52) U.S. Cl.
CPC .......... *H04L 43/045* (2013.01); *G06T 11/206* (2013.01); *G06T 11/60* (2013.01); *H04L 67/02* (2013.01)

(58) Field of Classification Search
CPC ..... G06T 11/206; G06T 11/60; H04L 43/045; H04L 67/02
See application file for complete search history.

(56) References Cited

U.S. PATENT DOCUMENTS

| | | | | |
|---|---|---|---|---|
| 6,023,571 A | * | 2/2000 | Matsumoto | G06N 5/025 703/2 |
| 6,970,560 B1 | * | 11/2005 | Hench | H04L 5/0046 375/254 |
| 7,003,079 B1 | * | 2/2006 | McCarthy | H04M 3/493 379/265.02 |
| 2013/0144825 A1 | * | 6/2013 | Ide | G06N 5/02 706/46 |

OTHER PUBLICATIONS

B. Alper, B. Bach, N. Henry Riche, T. Isenberg, and J.-D. Fekete. Weighted graph comparison techniques for brain connectivity analysis. In Proc. CHI, 483-492, 2013.
B. Bach, E. Pietriga, and J.-D. Fekete. Graphdiaries: Animated transitions and temporal navigation for dynamic networks. IEEE TVCG, 20(5):740-754, 2014.

(Continued)

*Primary Examiner* — Joe Chacko
(74) *Attorney, Agent, or Firm* — Keller Jolley Preece

(57) ABSTRACT

The present disclosure is directed toward systems and methods for analyzing event sequence data. Additionally, the present disclosure is directed toward systems and methods for providing visualizations of event sequence data analyses. For example, systems and methods described herein can analyze event sequence data related to websites and provide matrix-based visualizations of the event sequence data. The matrix-based visualization can be interactive and can allow a user to trace changes in traffic volume across webpages and hyperlinks of a website.

20 Claims, 12 Drawing Sheets

(56) References Cited

OTHER PUBLICATIONS

J. Bertin. Semiology of Graphics: Diagrams, Networks, 8Maps. University of Wisconsin Press, 1983.

A. Bezerianos, P. Dragicevic, J.-D. Fekete, J. Bae, and B. Watson. GeneaQuilts: A System for Exploring Large Genealogies. IEEE TVCG, 16(6):1073-1081, 2010.

J. Brainerd and B. Becker. Case study: e-commerce clickstream visualization. In Proc. InfoVis, 153, 2001.

S. Bremm, T. von Landesberger, M. Hess, T. Schreck, P. Weil, and K. Hamacherk. Interactive visual comparison of multiple trees. In Proc. VAST, 31-40, 2011.

I. Cadez, D. Heckerman, C. Meek, P. Smyth, and S. White. Visualization of navigation patterns on a web site using model-based clustering. In Proc. KDD, 22 pages 2000.

M. Ghoniem, J.-D. Fekete, and P. Castagliola. On the readability of graphs using node-link and matrix-based representations: A controlled experiment and statistical analysis. Info. Vis., 4(2):114-135, 2005.

M. Gleicher, D. Albers, R. Walker, I. Jusufi, C. D. Hansen, and J. C. Roberts. Visual comparison for information visualization. Info. Vis., 10(4):289-309, 2011.

D. Gotz and H. Stavropoulos. Decisionflow: Visual analytics for high-dimensional temporal event sequence data. IEEE TVCG, 20(12):1783-1792, 2014.

J. Guerra-Gomez, M. Pack, C. Plaisant, and B. Shneiderman. Visualizing change over time using dynamic hierarchies: Treeversity2 and the stemview. IEEE TVCG, 19(12):2566-2575, 2013.

D. Holten and J. J. van Wijk. Visual comparison of hierarchically organized data. Comp. Graph. Forum, 27(3):759-766, 2008.

J. I. Hong, J. Heer, S. Waterson, and J. Landay. Webquilt: A proxy-based approach to remote web usability testing. IEEE Trans. Info. Sys, 19(3):263-285,2001.

S. Kannappady, S. P. Mudur, and N. Shill. Visualization of web usage patterns. In Proc. IDEAS, 220-227, 2006.

M. Krstajic, E. Bertini, and D. Keim. Cloudlines: Compact display of event episodes in multiple time-series. IEEE TVCG, 17(12):2432-2439, 2011.

B. Lee, G. G. Robertson, M. Czerwinski, and C. S. Parr. Candidtree: visualizing structural uncertainty in similar hierarchies. Info. Vis., 6(3):233-246, 2007.

J. Lee, M. Podlaseck, E. Schonberg, and R. Hoch. Visualization and analysis of clickstream data of online stores for understanding web merchandising. Data Mining and Knowledge Discovery, 5:59-84, 2001.

E. Maguire, P. Rocca-Serra, S.-A. Sansone, J. Davies, and M. Chen. Visual compression of workflow visualizations with automated detection of macro motifs. IEEE TVCG, 19(12):2576-2585, 2013.

M. Monroe, R. Lan, H. Lee, C. Plaisant, and B. Shneiderman. Temporal event sequence simplification. IEEE TVCG, 19(12):2227-2236, 2013.

M. Monroe, R. Lan, J. Morales del Olmo, B. Shneiderman, C. Plaisant, and J. Millstein. The challenges of specifying intervals and absences in temporal queries: A graphical language approach. In Proc. CHI, 2349-2358, 2013.

T. Munzner, F. Guimbreti'ere, S. Tasiran, L. Zhang, and Y. Zhou. Treejuxtaposer: scalable tree comparison using focus+context with guaranteed visibility. ACM Trans. Graphics, 22(3):453-462, 2003.

A. Perer and J. Sun. Matrixflow: Temporal network visual analytics to track symptom evolution during disease progression. In Proc. AMIA, 716-725, 2012.

A. Perer and F. Wang. Frequence: Interactive mining and visualization of temporal frequent event sequences. In Proc. AVI, 153-162, 2014.

C. Plaisant, B. Milash, A. Rose, S. Widoff, and B. Shneiderman. Lifelines: visualizing personal histories. In Proc. CHI, 221-227, 1996.

P. Riehmann, M. Hanfler, and B. Froehlich. Interactive sankey diagrams. In Proc. InfoVis, 233-240, 2005.

Y. Tu and H.-W. Shen. Visualizing changes of hierarchical data using treemaps. IEEE TVCG, 13(6):1286-1293, 2007.

F. van Ham, H. Van De Wetering, and J. van Wijk. Interactive visualization of state transition systems. IEEE TVCG, 8(4):319-329, 2002.

T.D. Wang, C. Plaisant, A. J. Quinn, R. Stanchak, S. Murphy, and B. Shneiderman. Aligning temporal data by sentinel events: Discovering patterns in electronic health records. In Proc. CHI, 457-466, 2008.

J. Wei, Z. Shen, N. Sundaresan, and K.-L. Ma. Visual cluster exploration of web clickstream data. In Proc. VAST, 3-12, 2012.

K. Wongsuphasawat and D. Gotz. Exploring flow, factors, and outcomes of temporal event sequences with the outflow visualization. IEEE TVCG, 18(12):2659-2668, 2012.

K. Wongsuphasawat, J. A. Guerra G'omez, C. Plaisant, T. D. Wang, M. Taieb-Maimon, and B. Shneiderman. Lifeflow: visualizing an overview of event sequences. In Proc. CHI, 1747-1756, 2011.

J. Zhao, F. Chevalier, C. Collins, and R. Balakrishnan. Facilitating discourse analysis with interactive visualization. IEEE TVCG, 18(12):2639-2648, 2012.

J. Zhao, S. M. Drucker, D. Fisher, and D. Brinkman. Timeslice: Interactive faceted browsing of timeline data. In Proc. AVI, 433-436, 2012.

\* cited by examiner

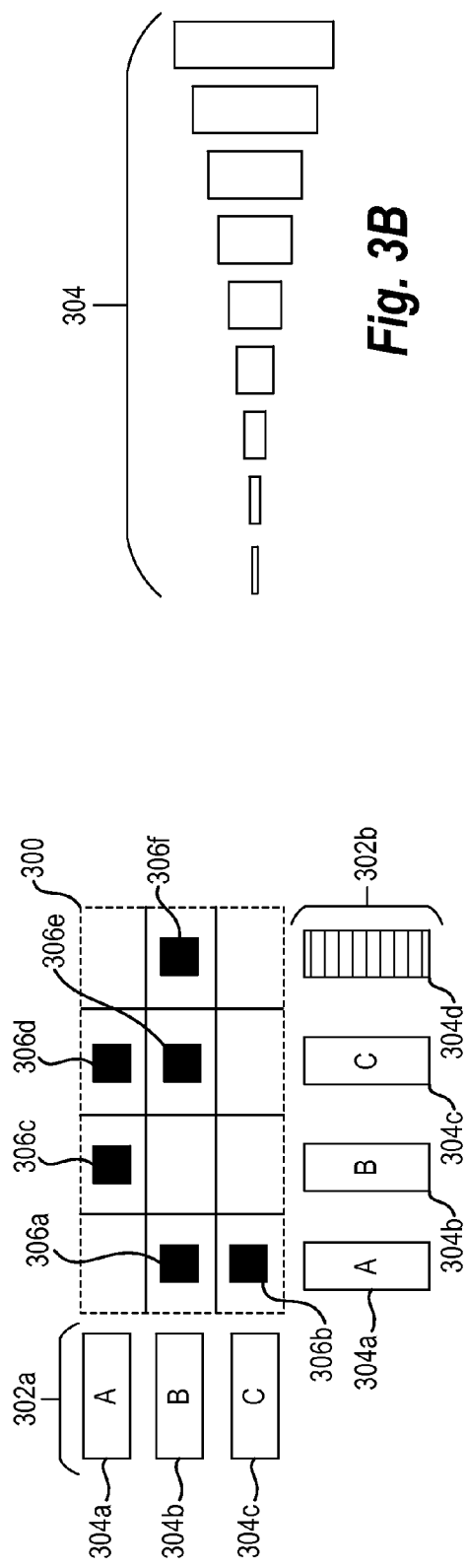
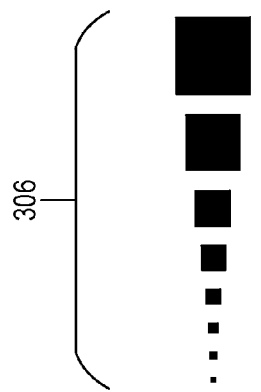
*Fig. 3A*
*Fig. 3B*
*Fig. 3C*

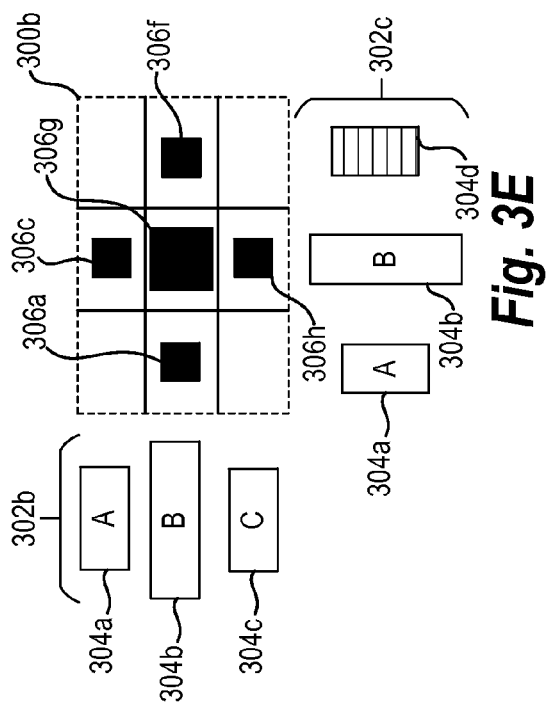
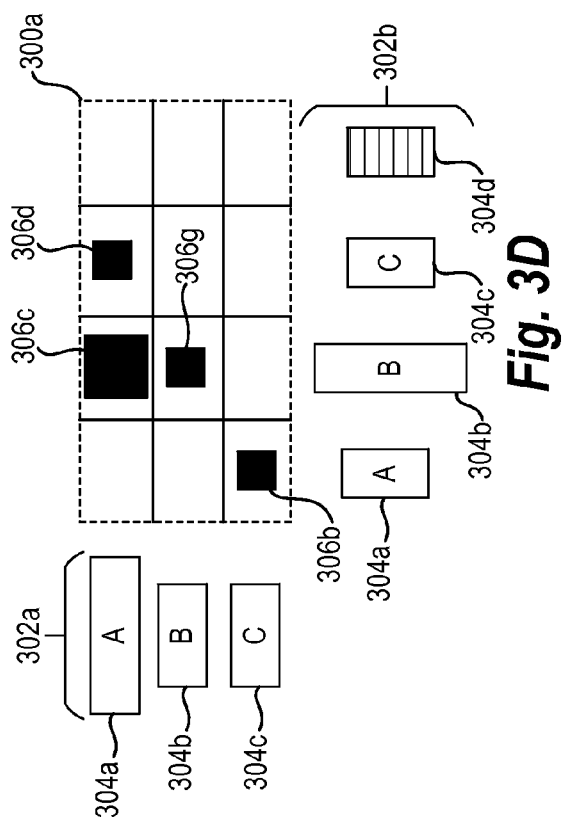

PROVIDING VISUALIZATIONS OF EVENT SEQUENCE DATA

CROSS REFERENCE TO RELATED APPLICATIONS

N/A

BACKGROUND

1. Technical Field

One or more embodiments described herein relate generally to providing event sequence data analyses. More specifically, one or more embodiments relate to providing visualizations of event sequence data analyses.

2. Background and Relevant Art

Event sequence data analysis is common in many domains, including web and software development, transportation, and medical care. For example, websites log how users navigate their pages, airlines track events during airplane flights, and hospitals record when patients transfer from one part of the hospital to another. Event sequence data analysis allows for an understanding of trends, sources of problems, and other information about the event sequence data. To aid in comprehension of event sequence data analysis, visualization techniques are often used to convey information about the event sequence data. Unfortunately, conventional event sequence data analysis visualization techniques have various drawbacks. Several of these drawbacks are described below in reference to website event sequence data.

Modern websites typically include multiple webpages that a user transitions through via hyperlinks connecting one webpage to another. For example, a website generally has a home page including multiple hyperlinks that direct a user to other webpages within the website. Accordingly, a user can transition from the home page to another webpage within the website by clicking on the provided hyperlinks. In this way, a website user can search for a particular product, review product pages, purchase a product, and so forth.

Occasionally, a user will transition through a website and then leave the website without making a purchase. Website managers generally refer to this as "user fallout." Typically, the goal of a commercial website manager is to minimize user fallout. In order to minimize user fallout, a website manager (i.e., a web master) analyzes website event sequence logs in order to identify where website users lose interest and leave the website. The event sequence logs can include web traffic information indicating how users of a website transition through and eventually leave the website. The process of analyzing web traffic information is generally referred to as "clickstream analysis." A problem arises, however, in that the event sequence logs include a great deal of information that is generally not in a format that is easily understood by web managers for purposes of clickstream analysis.

For this reason, website managers typically utilize various tools to assist them in analyzing and visualizing event sequence log information. These tools generally provide visualizations that illustrate how users of the website transition from one webpage to another webpage, and so on. One such tool is the Sankey diagram. The Sankey diagram visualizes event sequence data by providing two or more columns, wherein each column includes a listing of webpages. The Sankey diagram further includes edges connecting webpages between the columns. For example, to illustrate one level of web traffic related to a website consisting of three webpages (i.e., webpage A, webpage B, and webpage C), the Sankey diagram can include two columns, each column including webpages A, B, and C. Then, for each user who transitioned from one webpage to another (e.g., the user started at webpage A, then clicked a hyperlink to transition to webpage B), the Sankey diagram would include an edge connecting webpage A in the first column to webpage B in the second column. The thickness of the edges connecting webpages between columns in a Sankey diagram corresponds to the volume of user traffic between the webpages (i.e., the edge connecting the home page to a popular product page may be very thick, while the edge connecting the home page to a less popular product page may be less thick).

As a website becomes more complex (i.e., more webpages and hyperlinks) and becomes more heavily trafficked, existing analysis and visualization tools typically fail to provide accurate representations of sequence data. For example, a Sankey diagram of a heavily trafficked website is generally very difficult to read accurately in light of the multitude of intersecting edges of various thicknesses between the columns. This problem is typically common to existing analysis and visualization tools. Thus, performing a clickstream analysis while utilizing a Sankey diagram and other similar tools becomes cumbersome and difficult.

Furthermore, existing analysis and visualization tools generally do not provide accurate representations of a comparison of two sets of event sequence data. For example, a website manager may overhaul the design and layout of a website. In order to determine the effect that the website overhaul has on user traffic, the website manager may desire to compare a data set including web traffic data from before the overhaul to a data set including web traffic data from after the overhaul. As was mentioned above, tools such as the Sankey diagram provide comparison visualizations that are generally crowded and difficult to understand, particularly when comparing multiple data sets.

Thus, current methods of providing visualizations for event sequence data include several disadvantages that lead to ineffective analyses.

SUMMARY

One or more embodiments described herein provide benefits and/or solve one or more of the foregoing or other problems in the art with systems and methods that provide users with accurate and easily understandable visualizations of complex event sequence information. For example, one or more embodiments involve generating one or more matrices representing transitions between events in a sequence. The systems and methods can add visual indicators within the one or more matrices to indicate how many events occur. The matrix-based visualizations accurately provide this information in a way that is clear and easy to understand, even when comparing dense sequence data.

In particular, one or more embodiments provide an arrangement of matrices illustrating successive steps in a sequence. The arrangement of matrices comprises various matrices that are rotated and concatenated side-by-side in a zig-zag manner. The zig-zag design can directly expose traffic statistics for individual nodes and for step-to-step transitions. Furthermore, the zig-zag design can allow for individual navigation paths to be isolated as zig-zag paths through the sequence of matrices. The arrangement of matrices can further include visual encodings to support comparison tasks based on this visualization. The arrangement of matrices can provide an analyst an overall picture of the sequence event data that allows for identification of popular nodes and transitions from histogram statistics. Furthermore, arrangement of matrices can allow for visualization of how the popularity of nodes and transitions change between dates or between users.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which:

FIGS. 3A-3K illustrate event sequence data visualizations in accordance with one or more embodiments;

DETAILED DESCRIPTION

Figure 1:
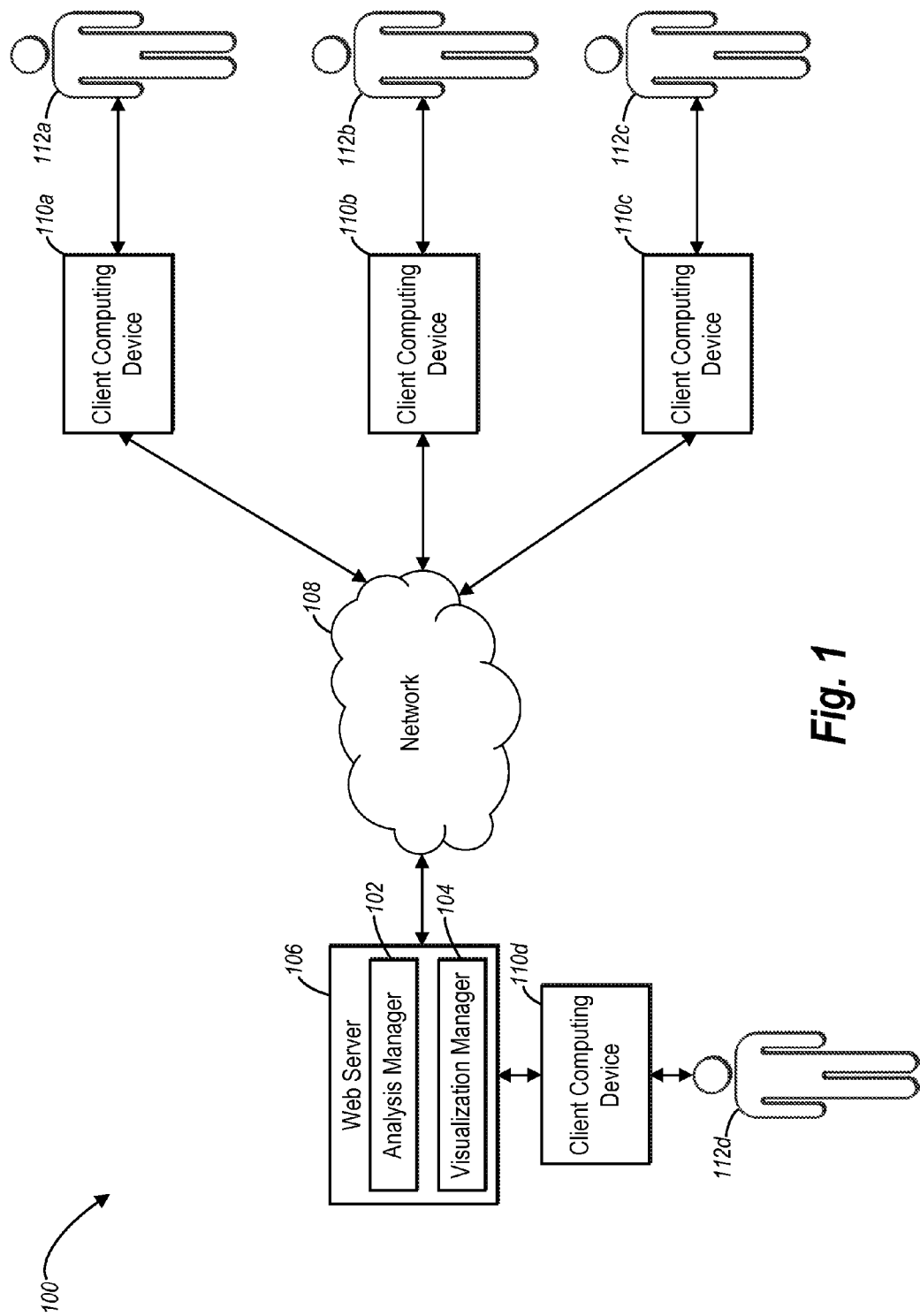
FIG. 1 illustrates a block diagram of an environment for implementing an analysis and visualization system in accordance with one or more embodiments.

One or more embodiments described herein include an analysis and visualization system that provides users with accurate and easily understandable visualizations of complex event sequence information. For example, the analysis and visualization system can generate a plurality of matrices representing transitions between events in a sequence. The analysis and visualization system can add visual indicators to the matrices to indicate how many events occur. The analysis and visualization system accurately provide information in a way that is clear and easy to understand, even when comparing dense sequence data.

In particular, the analysis and visualization system can provide an arrangement of matrices illustrating successive steps in a sequence. The arrangement of matrices comprises various matrices that are rotated and concatenated side-by-side in a zig-zag manner. The zig-zag design can directly expose traffic statistics for individual nodes and for step-to-step transitions. Furthermore, the zig-zag design can allow for individual navigation paths to be isolated as zig-zag paths through the sequence of matrices. The arrangement of matrices can further include visual encodings to support comparison tasks based on this visualization. The arrangement of matrices can provide an analyst an overall picture of the sequence event data that allows for identification of popular nodes and transitions from histogram statistics. Furthermore, arrangement of matrices can allow for visualization of how the popularity of nodes and transitions change between dates or between users.

The analysis and visualization system can provide an arrangement of matrices that allows for visualization of event sequence data for any number of different types of event sequence data. For example, as mentioned above, the analysis and visualization system can provide matrix-based visualizations of web and software development, transportation, medical care, or other types of event sequence data. To aid in description, the bulk of the description included below is directed toward the use of matrix-based visualizations of website event sequence data (e.g., web clickstream data). One will appreciate in light of the disclosure herein that the analysis and visualization system can provide matrix-based visualizations of other types of event sequence data.

As used herein, "event sequence data" includes any body of data representative of a sequence of events. Also as used herein, an "event" includes any occurrence that can happen in a sequence. For example, in the context of website analysis, an event can include: a web page request, a web page opening, a hyperlink click, a multimedia interaction, etc. Accordingly, within the same context, event sequence data can include a logged sequence of web page openings, hyperlink clicks, etc. It follows that an "event sequence," as used herein, represents a sequential body of data that includes two or more events (e.g., a sequential list of hyperlinks clicked by a particular user over a period of time). Each event in an event sequence can include a time stamp to provide a sequence to the events.

One or more embodiments described herein include an analysis and visualization system that allows website managers to quickly and easily understand how website users transition through a given website. For example, the analysis and visualization system can analyze a set of website data to determine webpages and hyperlinks within a website that are most often visited and traversed by website users. Furthermore, the analysis and visualization system can provide matrix-based visualizations of website data analyses that can quickly and easily be understood by a website manager.

Additionally, the analysis and visualization system can analyze and provide visualizations for more than one dataset related to a particular website. For example, a website manager can utilize the analysis and visualization system to determine whether changes to a particular website have had a detrimental effect on website traffic. In one or more embodiments, the website manager can accomplish this by providing two or more datasets representing website traffic over two or more periods of time. The analysis and visualization system can provide a matrix-based visualization that illustrates changes between the two or more datasets that represent increases or decreases in website traffic. Accordingly, the website manager can easily discover the effect that changes to the website have had with regard to website traffic.

For example, in one or more embodiments, the analysis and visualization system can access event sequence log files (e.g., clickstream data) containing a history of webpage requests/actions by users. By parsing these log files, the analysis and visualization system can identify sequences of events initiated by website users (e.g., clicking on a link, clicking on a menu, filling out, pressing return, making a purchase, downloading an item). The analysis and visualization system can utilize these identified event sequences to generate a visualization of the information contained within the log files. As used herein, "clickstream data" refers to data received and stored by one or more servers, by way of log files or direct reporting (i.e., via page tagging, tracking pixels, etc.), that is indicative of website interactions and traffic.

In one or more embodiments, the visualization generated by the analysis and visualization system is a matrix that illustrates transitions in event sequence data. For example, in order to generate a visualization of web traffic data that represents a website user transitioning from webpage A to webpage B (via a hyperlink click), the analysis and visualization system can generate a matrix containing a row associated with webpage A and a column associated with webpage B. The analysis and visualization system can illustrate the website user's transition from webpage A to webpage B by placing a marker within the matrix at the intersection of the row associated with webpage A and the column associated with webpage B. The analysis and visualization system can continue this process for other website users until the generated matrix illustrates an accurate representation of transitions made between webpages for all website users during a certain period of time or number of events. The analysis and visualization system can add indicators to the generated matrix that indicate webpages and hyperlinks that experience higher levels of user traffic.

Furthermore, the analysis and visualization system can generate a second matrix illustrating website users next transition within the website. For example, the analysis and visualization system parses an event sequence log to identify that a website user transitions via hyperlink clicks from webpage A to webpage B to webpage C. Accordingly, the website user's second transition is from webpage B to webpage C. Thus, in one or more embodiments, the analysis and visualization system can generate a second matrix illustrating the user's second transition, in a similar manner as described above.

Additionally, the analysis and visualization system can concatenate the first and second matrices in order to provide an accurate and easy to under visualization that illustrates how website users transition through the website, webpage by webpage. For example, as both the first transition and the second transition described above have a webpage in common, the analysis and visualization manager can concatenate the first and second matrices along the first matrix column and the second matrix row that are both associated with webpage B. In order for the concatenation of the two matrices to be easily read and understood, the analysis and visualization system can rotate one or both of the first matrix and the second matrix, such that one or more embodiments display the resulting concatenation in a zig-zag pattern.

The analysis and visualization system can also compare two sets of event sequence data against each other and generate a visualization that illustrates differences between the two sets of event sequence data. For example, a website including webpages A, B, and C may experience a certain level of traffic in the morning and a different level of traffic in the evening. Accordingly, the analysis and visualization system can generate one or more matrices illustrating the level of traffic in the morning, and then may add visual indicators to the one or more matrices indicating webpages and hyperlinks within the website that experience changes in traffic levels in the evening. Thus, a website manager can utilize the comparison generated by the analysis and visualization system to identify webpages and hyperlinks that attract and lose website users in the morning versus in the evening.

FIG. 1 is a schematic diagram illustrating an environment or system for implementing an analysis and visualization system 100 in accordance with one or more embodiments. As illustrated in FIG. 1, the system may include users 112a, 112b, 112c, and 112d, client computing devices 110a, 110b, 110c, and 110d, a network 108 (e.g., the Internet), a web server 106, and an analysis manager 102 and visualization manager 104. As further illustrated in FIG. 1, a client computing device can communicate with the web server 106 through the network 108 (e.g., as with client devices 110a-110c). Additionally or alternatively, also as illustrated in FIG. 1, a client computing device can communicate directly with the web server 106 (e.g., as with the client device 110d). Although FIG. 1 illustrates a particular arrangement of the users 112a-112d, the client computing devices 110a-110d, the network 108, and the web server 106, various additional arrangements are possible.

While FIG. 1 illustrates four users 112a-112d, the analysis and visualization system 100 can include more than four users. For example, in one or more embodiments, the analysis and visualization system 100 can handle data related to as many client computing devices as are supported by the web server 106. The users 112a-112d may be individuals (i.e., human users), businesses, groups, or other entities.

The client computing devices 110a-110d may include various types of computing devices. For example, the client computing devices 110a-110d can include a mobile device such as a mobile telephone, a smartphone, a PDA, a tablet, a laptop or a non-mobile device such as a personal computing device, a server, or another type of computing device. Further the client computing devices 110a-110d may run web browser software. A web browser is a software application that allows a user to request, view, and interact with one or more webpages.

Additionally, in one or more embodiments, the client computing devices 110a-110d of the analysis and visualization system 100 can communicate with the web server 106 through the network 108. In one or more embodiments, the network 108 may include the Internet or World Wide Web. The network 108, however, can include various other types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Example network and network features are described below with reference to FIG. 6 below.

In one or more embodiments, the web server 106 can be a computer system that hosts data representative of one or more websites. As used herein, a "website" is simply a group of webpages organized under a hierarchy. As used herein a "webpage" is a document that, when delivered to a web browser, causes the web browser to display various components to a user of a client computing device. A user may interact with a webpage by clicking on a hyperlink. As used herein, a "hyperlink" is an interactive element that references another webpage that the user can navigate, or "link," to by clicking the hyperlink.

Each of the one or more websites hosted by the web server 106 can include webpages that are used for purposes such as data storage, gaming, retail, social networking, email, FTP (i.e. file transfer protocol), and so on. The web server 106 can utilize various communication protocols (e.g., hypertext transfer protocol or "HTTP") to receive requests for webpages. For example, the user 112*a* may send a request for a webpage via a web browser associated with the client computing device 110*a*. The client computing device 110*a* can transmit the webpage request to the web server 106 via the network 108. Upon receiving the webpage request, the web server 106 can identify the data associated with the requested webpage, and provide the identified data back to the client computing device 110*a*, where the web browser can display the requested webpage.

The web server 106 can provide web data including hypertext markup language documents (i.e., "HTML"), which may include text, images, style sheets, scripts, etc. Additionally, the web server 106 can also receive content from a client computing device via an HTML document that features a web form (i.e., a control that allows a user to input data such as text that the web browser can transmit to the web server). In this way, users can receive and view webpages the include rich content including multimedia, formatted text, web forms, etc. For example, the user 112*a* can request webpages associated with a retail website from the web server 106 via the client computing device 110*a*. The web server 106 can provide webpages containing content describing and illustrating various retail products to the client computing device 110*a*. The user 112*a* can then utilize the functionality provided within the webpages to select and purchase one or more retail products. The web server 106 can receive and process the transaction details associated with the purchase.

In one embodiment, the web server 106 stores data associated with the various data requests that it receives and processes. For example, as described above, the users 112*a*-112*d* may request webpage data from the web server 106. Upon receiving a data request from a user, the web server 106 can store a log file that contains information related to the data request 106. The log file can contain information related to webpage request (e.g., identifying information related to the user who made the request), information related to hyperlinks clicked by a user, information related to multimedia interactions made by a user, information related to web form submissions made by a user, information related to file transfers initiated by a user, etc. Accordingly, the web server's log file can contain a complete record of each data request associated with a website hosted by the web server 106. In one or more embodiments, the web server 106 can store the log files chronologically so as to indicate a sequence of events.

Additionally or alternatively, rather than storing only information related to webpage requests, the web server 106 may also receive event sequence data via page tagging. For example, a web page may include a tracking pixel, web bug, or another type of code that activates when a user opens the web page, or performs some other event in relation to the web page (e.g., clicks a hyperlink, interacts with a control, initiates a multimedia element, etc.). The page tag embedded in the web page can automatically report the event back to the web server 106. In one or more alternative embodiments, the web server 106 may actually include multiple web servers working in cooperation with each other.

Although FIG. 1 shows the analysis manager 102 and the visualization manager 104 hosted on the web server 106, in alternative embodiments, the analysis manager 102 and the visualization manager 104 may be hosted on a separate analytics server (not shown). In that case, the analysis manager 102 and the visualization manager 104 can receive log files from one or more web servers (e.g., the web server 106). Additionally in that case, the analysis manager 102 and the visualization manager 104 can receive direct reports via one or more web page's embedded page tagging.

In one or more embodiments, the analysis manager 102 and the visualization manager 104 can provide various display outputs to a terminal associated with the web server 106. For example, as shown in FIG. 1, the client computing device 110*d* can be a terminal for the web server 106. Accordingly, the user 112*d* (i.e., a website manager) can interact with the analysis manager 102 and the visualization manager 104 via the client computing device 110*d*. Additionally, the analysis manager 102 and the visualization manager 104 may provide the user 112*d* with graphical displays associated with web server data via a display of the client computing device 110*d*. Alternatively, the webserver 106 may not require a terminal (e.g., such as the client computing device 110*d*), but may have input/output means of its own, or alternatively may provide a virtual terminal that may be accessed by any user 112*a*-112*c* over then network 108 via a web browser.

Figure 2:
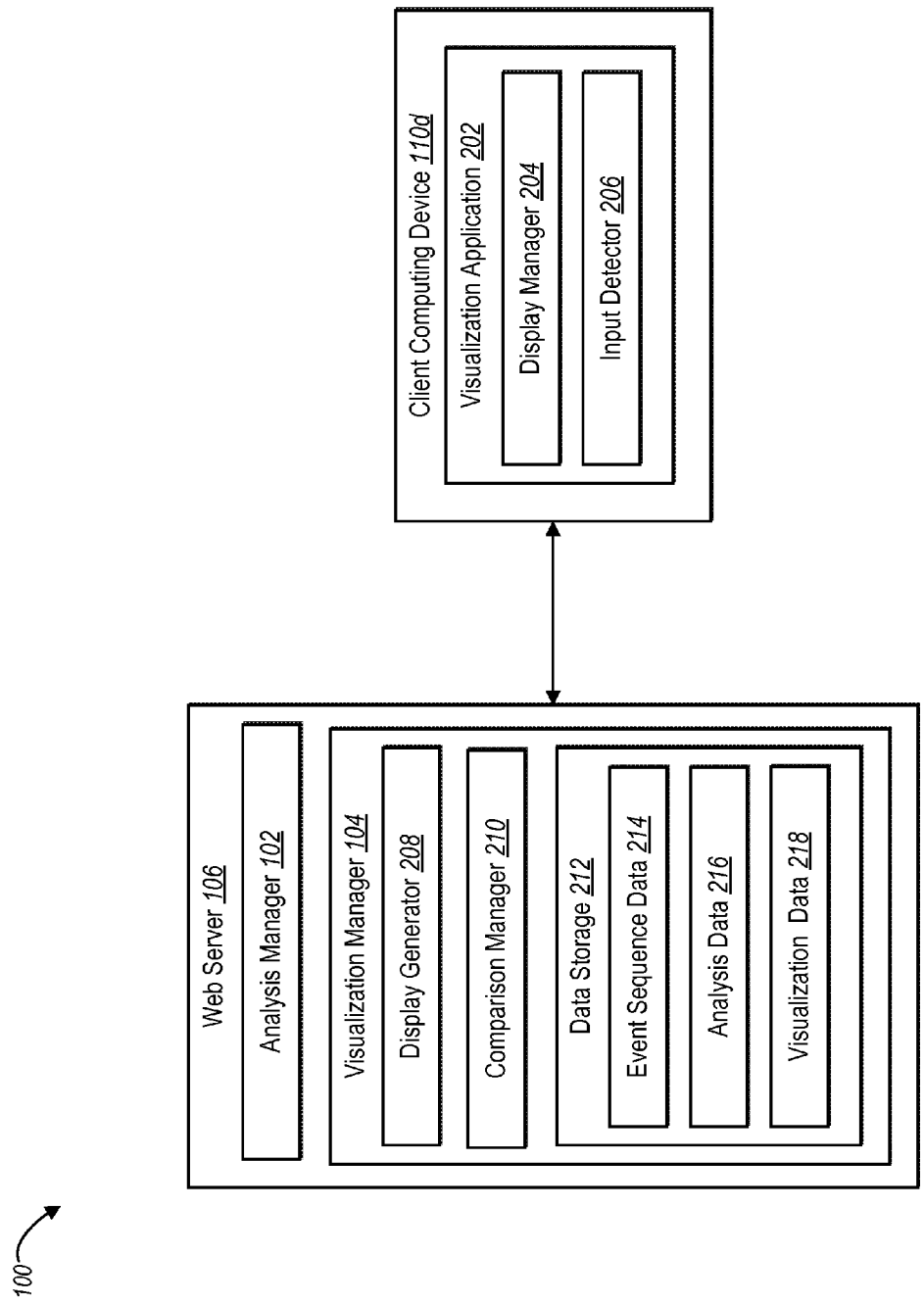
FIG. 2 illustrates a schematic diagram of the analysis and visualization system of FIG. 1 in accordance with one or more embodiments.

FIG. 2 illustrates a schematic diagram illustrating an example embodiment of the analysis and visualization system 100. As shown, the analysis and visualization system 100 can include various components for performing the processes and features described herein. For example, as shown in FIG. 2, the client-computing device (i.e., the client computing device 110*d*) may include a visualization application 202. In one or more embodiments, the visualization application 202 can include a display manager 204 and an input detector 206. Additionally, as shown in FIG. 2, the visualization manager 104 can include a comparison manager 208, a display generator 210, and a data storage 212. The data storage 212 can store event sequence data 214, analysis data 216, and display data 218. Although the disclosure herein describes the components 202-218 as separate, as illustrated in FIG. 2, any of the components 202-218 may be combined into fewer components, such as into a single facility or module, or divided into more components as may serve one or more embodiments.

Each of the components 202-206 of the visualization application 202 and the components 102, 104, and 208-218 of the web server 106 can be implemented using a computing device including at least one processor executing instructions that cause the analysis and visualization system 100 to perform the processes described herein. In some embodiments, the components 204-206 of the visualization application 202 and the components 102, 104, and 208-218 of the web server 106 can all be implemented by a single server device, or across multiple server devices. Additionally or alternatively, a combination of one or more server devices and one or more client devices can implement the components 204-206 of the visualization application 202 and the components 102, 104, and 208-218 of the web server 106. Furthermore, in one embodiment, the components 204-206 of the visualization application 202 and the components 102, 104, and 208-218 of the web server 106 can comprise hardware, such as a special-purpose processing device to perform a certain function. Additionally or alternatively, the components 204-206 of the visualization application 202 and the components 102, 104, and 208-218 of the web server 106 can comprise a combination of computer-executable instructions and hardware.

In one or more embodiments, the visualization application 202 can be a native application installed on the client computing device 110*d*. For example, the visualization application 202 may be a mobile application that installs and runs on a mobile device, such as a smart phone or a tablet. Alternatively, the visualization application 202 can be a desktop application, widget, or other form of a native computer program. Alternatively, the visualization application 202 may be a remote application that the client computing device 110d accesses. For example, the visualization application 202 may be a web application that is executed within a web browser of the client computing device 110d.

As mentioned above, and as shown in FIG. 2, the visualization application 202 can include a display manager 204. The display manager 204 can provide, manage, and/or control a graphical user interface (or simply "user interface") that allows a user to interact with the analysis manager 102 and with the visualization manager 104. For example, the display manager 204 can provide a user interface that facilitates the display of an analysis visualization. Likewise, the display manager 204 can provide a user interface that allows a user to configure analyses settings, choose one or more data sets for analysis, interact with displayed visualizations, etc.

More specifically, the display manager 204 can facilitate the display of a user interface (e.g., by way of a display device associated with the client computing device 110d) that allows a user to interact with the analysis manager 102. As mentioned above, the analysis and visualization system 100 enables a user to perform analyses of event sequence data sets. By utilizing user interfaces provided by the display manager 204, a user can configure analyses settings such that the analysis manager 102 performs one or more analyses of the data stored by the web server 106 within the parameters defined by the user-configured analyses settings. For example, the display manager 204 may generate a user interface of a plurality of graphical components, objects, and/or elements that allow a user to select a data set, configure time thresholds, identify key limiting factors, etc. In response to a user configuring analysis settings via the provided user interface, the display manager 204 can provide the configured settings to the analysis manager 102 via the visualization application 202.

Additionally, the display manager 204 can facilitate the display of analyses visualizations. For example, in response to receiving analysis settings from the visualization application 202, the analysis manager 102 can perform the analysis and the visualization manager 104 can generate a visual representation of the results of the analysis. In one or more embodiments, the visualization manager 104 can provide the generated analysis visualization to the visualization application 202. Accordingly, the display manager 204 may direct the client computing device 110d to display a group of graphical components, objects, and/or elements that enable a user to view and interact with the provided analysis visualization.

Accordingly, the display manager 204 can facilitate the input of text or other data to be used in configuring analysis settings, or interacting with an analysis visualization. For example, the display manager 204 can provide a user interface that includes a touch screen display keyboard. A user can interact with the touch screen display keyboard using one or more touch gestures to select text or other data to be included in an analysis setting. In addition to text, the touch screen display keyboard interface provided by the display manager 204 can facilitate the input of various other characters, symbols, icons, or other character information.

Furthermore, the display manager 204 can provide and update a graphical user interface, or transition between two or more graphical user interfaces. For example, in one embodiment, the display manager 204 can provide an analysis visualization graphical user interface via a display of the client computing device 110d. Then, in response to a detected interaction with the provided visualization, the display manager 204 can provide an enlarged view of a portion of the visualization (i.e., in response to a "zoom-in" gesture) within the graphical user interface, highlight a portion of the visualization within the graphical user interface, add additional visual indicators to the visualization within the graphical user interface, and so forth. Additionally, the display manager 204 can transition from one graphical user interface to another. For example, the display manager 204 may transition through a series of graphical user interfaces in response to a user configuring a series of analysis settings.

As further illustrated in FIG. 2, the visualization application 202 can include a user input detector 206. In one or more embodiments, the user input detector 206 can detect, receive, and/or facilitate user input in any suitable manner. In some examples, the user input detector 206 can detect one or more user interactions with respect to the user interface. As referred to herein, a "user interaction" means a single interaction, or combination of interactions, received from a user by way of one or more input devices.

For example, the user input detector 206 can detect a user interaction from a keyboard, a mouse, a touch pad, a touch screen, and/or any other input device. In the event the client computing device 110d includes a touch screen, the user input detector 206 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 206 may additionally, or alternatively, receive data representative of a user interaction. For example, the user input detector 206 may receive one or more user configurable parameters from a user, one or more commands from the user, and/or any other suitable user input. The user input detector 206 may receive input data from one or more components of the analysis manager 102 or the visualization manager 104, from a data storage associated with the client computing device 110d, or from one or more remote locations (e.g., the web server 106).

As discussed above, the web server 106 can provide, or "serve," various types of data in response to client requests, and can store log files associated with the client requests and direct reports from various types of embedded page tagging. Accordingly, as shown in FIG. 2, the analysis manager 102 can communicate with the web server 106 in order to access and analyze the stored log files. For example, as described above, the web server 106 can collect data related to each data request received from one or more users 112a-112d via the client computing devices 110a-110d, respectively. Thus, the web server 106 can maintain log files containing information related to webpage landings, hyperlink clicks, media interactions, file requests, etc. The web server 106 can organize, compile, and/or store log files according to a range of time associated with the data in each log file, according to one or more users associated with the data in each log file, according to the type of data in each log file, as so forth.

In one or more embodiments, the analysis manager 102 can request one or more log files from the web server 106 in order to perform an analysis of the data contained therein. In one embodiment, the analysis manager 102 may request one or more log files in response to analysis configuration settings received from a user via the client computing device

110*d*. For example, the user 112*d* may request, via the visualization application 202, an analysis of log file data for a period of time including the previous week. Accordingly, the analysis manager 102 can request log files from the web server 106 that include all dates included in the previous week. Additionally or alternatively, the analysis manager 102 may request log files from the web server 106 on a regular schedule (i.e., once a day, every hour, etc.) and not in response to analysis configuration settings received from a user.

The analysis manager 102 can also parse the log files received from the web server 106. For example, in one or more embodiments, the analysis manager 102 can receive log files from the web server 106 in a variety of formats. In order for the analysis manager 102 to perform an analysis of the received log files, the analysis manager 102 can parse the received log files into a standard format. For instance, the analysis manager 102 can parse the received log files based on each webpage within the website for which the web server 106 received data requests. The analysis manager 102 can also parse the received log files based on hyperlinks clicked by visitors to the website.

The analysis manager 102 can parse the log files in order to determine an event sequence including the path a website visitor takes through the website (i.e., the website visitor's "event sequence"). For example, a user may initially come to the website (i.e., land on the website) by typing "www.website.com/home.htm" into a web browser. From the landing page (i.e., "www.website.com/home.htm"), the user may click a hyperlink that directs the user to another page within the website, "www.website.com/product1.htm." From "www.website.com/product1.htm," the user may click another hyperlink that directs the user to a purchase page for "product1," "www.website.com/purchase.htm." The analysis 102 can parse the log files for the period of time over which the user requested data for "www.website.com" in order to determine an event sequence representative of the user's path through "www.website.com" first includes "home.htm," then "product1.htm," and then "purchase.htm."

The analysis manager 102 can also analyze multiple event sequences representative of various user paths related to a website for a given period of time. More specifically, the analysis manager 102 can identify one or more steps related to a website based on the analysis of multiple user paths through the website. As used herein, a "step" related to a website includes every website visited by all website visitors at a particular level of progression through the website. For example, the analysis manager 102 can determine that the first step related to a particular website includes every landing page (i.e., the first page visited by a website user) for all website users during a particular period of time. Next, the analysis manager 102 can determine that the second step related to the particular website includes every second page visited by all website users following the first step. The analysis manager 102 can continue to determine all steps related to the website for a particular period of time.

It follows that the analysis manager 102 can also identify each webpage within each step as well as the hyperlinks utilized by all website visitors to navigate to the next webpages in the next step. As used herein, the webpages included in each step are referred to as "nodes," and the hyperlinks between the webpages in each step are referred to as "node transitions." For example, over a one-hour period of time, users of a particular website may land on either "webpage one," "webpage two," or "webpage three." Accordingly, the analysis manager 102 would identify a first step for the one-hour period of time that includes the nodes, "webpage one," "webpage two," and "webpage three." In additional or alternative embodiments, a node can be something other than a webpage such as, but not limited to, a user action, a group of web pages (e.g., such as all web pages in a particular domain), a sequence of user actions, or a sequence of webpages, etc. One will appreciate that by allowing nodes to represent a group of pages or all pages in a particular domain, the analysis manager 102 can allow for scalability.

From each of the nodes identified in the first step, the users of the website may transition to another webpage within the website. Accordingly, the analysis manager 102 can identify all the nodes present in the second step (i.e., all the webpages next visited by the website users), as well as the node transitions (i.e., the hyperlinks) utilized by the website users in order to navigate from the nodes in the first step to the nodes in the second step. The analysis manager 102 can continue this process of identifying steps, nodes, and node transitions within the log files for the given period of time. In alternative embodiments, the analysis manager 102 may perform this process of identifying steps, nodes, and node transitions on-the-fly as data requests are received by the web server 106, rather than by parsing log files covering a particular period of time.

Furthermore, the analysis manager 102 can identify traffic volumes within the received log files. For example, in one or more embodiments, the log files for a particular website can indicate a volume of website users (i.e., a number of website users) who visit a particular page (i.e., a node within a step) in a certain period of time. Additionally, in one or more embodiments, the log files can indicate a volume of website users who traverse a certain hyperlink between two webpages (i.e., a node transition between two nodes within two adjacent steps). The log files may indicate these volumes simply by listing a number of corresponding requests for a given webpage or hyperlink. Accordingly, the analysis manager 102 can parse the log files in order to determine a volume of users associated with each node in each step, as well as a volume of users associated with each node transition between each step.

Once the analysis manager 102 has identified steps, nodes, node transitions, and user volumes associated with a particular log file, the visualization manager 104 can utilize the determined information to generate a visualization. As used herein, a "visualization" is a visual display of information. The visualization can include various display elements that represent different types of data. Additionally, in some embodiments, the visualization may also be interactive. The visualization manager 104 can provide the generated visualization to the display manager 204 of the client computing device 110*d* for display to the user 112*d*.

As illustrated in FIG. 2, the visualization manager 104 can include a display generator 208 and a comparison manager 210. The display generator 208 generates the visualization provided by the visualization manager 104 to the client computing device 110*d*. For example, in one or more embodiments, the display generator 208 utilizes the steps, nodes, node transitions, and user volumes identified by the analysis manager 102 to create a transition matrix. The transition matrix can be represented as a standard grid, where the rows of the grid include graphical node elements representative of the nodes of an identified first step, the columns of the grid include graphical node elements representative of the nodes of an identified second step, and each graphical link element within the grid represents a node transition from a node in the first step to a node in the second step. The display generator 208 can generate multiple transition matrices representing transitions from the first step to the second step, from the second step to the third step, from the third step to the fourth step, and so forth. As used herein, a "graphical node element" refers to a graphical representation of a node (i.e., an event such as visiting a web page), while a "graphical link element" refers to a graphical representation of a node transition between events or nodes traversed by a user.

In order to create a cohesive visualization that encompasses an event sequence of multiple steps represented within a given log file, the display generator 208 can create a matrix wave. A "matrix wave" is a visualization that includes multiple transition matrices that are concatenated along common steps. For example, the display generator 208 may begin creating a matrix wave by starting with a first transition matrix representing transitions from a first step to a second step. Next, the display generator 208 can concatenate a second transition matrix to the first transition matrix, wherein the second transition matrix represents transitions from the second step to a third step.

In order to concatenate two transition matrices together, the display generator 208 can rotate each transition matrix represented in the matrix wave so as to create a zig-zag pattern. For example, the display generator 208 can begin concatenating a first transition matrix to a second transition matrix by rotating the first transition matrix (representing transitions from the first step to the second step). Next, the display generator 208 can rotate and concatenate the second transition matrix (representing transitions from the second step to the third step) to the first transition matrix along the graphical node elements included in the second step. In other words, the first transition matrix includes rows representative of the nodes included in the first step, and columns representative of the nodes included in the second step. By rotating the second transition matrix, the rows of the second transition matrix are representative of the nodes included in the second step, and the columns of the second transition matrix are representative of the nodes included in the third step. Accordingly, the display generator 208 can concatenate the first transition matrix and the second transition matrix along the second step such that the columns of the first transition matrix and the rows of the second transition matrix are representative of the same nodes included in the second step.

Furthermore, the display generator 208 can add visual indicators to a transition matrix that illustrates user traffic volumes across nodes and node transitions. In one or more embodiments, as described above, the analysis manager 102 can determine how many website users visit given webpages (i.e., nodes) within the website, as well as how many website users traverse various hyperlinks (i.e., node transitions) within the website. In order to include this traffic volume information, the display generator 208 can include various mechanisms within a visualization. For example, the display generator 208 can change the size, color, or pattern of a graphical node elements or graphical link element within a displayed visualization in order to indicate more or less user traffic. Additionally or alternatively, the display generator 208 can add addition visual elements, such as overlays, to graphical node elements or graphical link elements in order to indicate more or less user traffic.

Additionally, as mentioned above, in some embodiments, the visualization provided by the visualization manager 104 may be interactive. Accordingly, in one or more embodiments, the display generator 208 can update a transition matrix or matrix wave in response to a user interaction. For example, in response to a user interaction originating at the client computing device 110d (e.g., a tap, a tap and hold, a swipe, etc.) the display generator 208 can update the provided visualization in a variety of ways. For instance, the display generator 208 may update the provided visualization such that a certain portion is highlighted, a certain portion is enlarged, a certain element is added (e.g., a trace line), etc.

In some embodiments, the visualization manager 104 can generate a visualization that compares a data set against one or more additional data sets. For example, as described above, the analysis manager 102 can identify a sequence data set including one or more steps, nodes, node transitions, and traffic volumes from one or more log files pertaining to a given website for a given time period. In one or more embodiments, the analysis manager 102 can identify a second data set including the same elements pertaining to the same website, but for a different time period. Accordingly, the comparison manager 210 can provide a comparison of the two data sets, based on changes to traffic volumes for the two time periods. The comparison manager 210 can provide the comparison to the display generator 208, which in turn, can add visual elements to the visualization in order to indicate the comparison between the two data sets.

Additionally, as mentioned above, and as illustrated in FIG. 2, the visualization manager 104 can include data storage 212 including event sequence data 214, analysis data 216, and visualization data 218. In one or more embodiments, the event sequence data 214 may include log file data received by the analysis manager 102. Furthermore, the analysis data 216 may include data related to steps, nodes, node transitions, and traffic volumes identified by the analysis manager 102 from one or more log files. Additionally, the analysis data 216 can include comparison data generated by the comparison manager 210. Finally, visualization data 218 may include data related to one or more visualizations generated by the visualization manager 104 pertaining to one or more data sets.

Figure 3G:
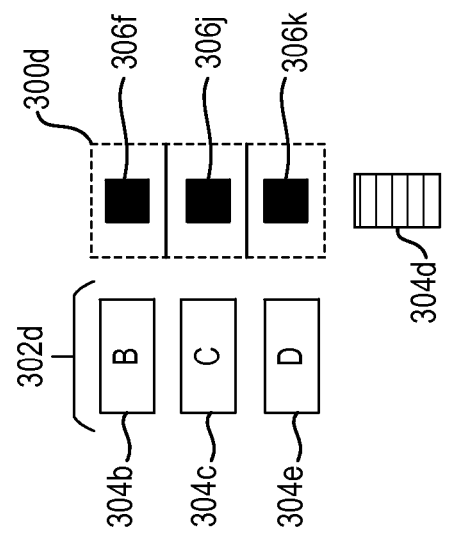

As discussed above, the visualization manager 104 can provide visualizations of log file analyses. This process will now be described in connection with FIGS. 3A-3K. As illustrated in FIG. 3A, the visualization manager 104 can generate a transition matrix 300. The transition matrix 300 can be a standard two-dimensional matrix with rows and columns, as shown in FIG. 3A. In additional or alternative embodiments, the transition matrix 300 can be multi-dimensional.

As described above, the analysis manager 102 can parse log files covering a particular range of time in order to identify event sequences for one or more users. The analysis manager 102 can then identify steps, nodes, node transitions, and traffic volumes from the identified event sequences. In one or more embodiments, the visualization manager 104 can generate the transition matrix 300 based on the steps, nodes, node transitions, and traffic volumes identified by the analysis manager 102. It will be understood, as described above, that FIGS. 3A-3K will be described with reference to a particular website. Accordingly, the graphical node elements and graphical link elements illustrated within FIGS. 3A-3K represent webpages and hyperlinks between the webpages within the particular website. In alternative embodiments, graphical node elements and graphical link elements can represent any other type of event sequence data (e.g., hospital intakes, airline flight schedules, automobile traffic, theme park visitors, etc.).

As illustrated in FIG. 3A, the graphical node elements 304a-304c can represent the rows and row headers of the transition matrix 300. As mentioned above, each of the graphical node elements 304a-304c in FIG. 3A represent a webpage within a given website. As shown in FIG. 3A, the first step 302a can include the graphical node elements 304a-304c. As described above, the first step 302a represents a collection of webpages where a group of website users first enter the given website. Accordingly, graphical node element 304a may represent the website's homepage (e.g., "www.website.com/home.htm"), while graphical node element 304b may represent a webpage featuring a popular product (e.g., "www.website.com/product1.htm"). Graphical node element 304c may represent a webpage describing the company who owns the website (e.g., "www.website.com/about.htm").

Also as illustrated in FIG. 3A, the graphical node elements 304a-304d can represent the columns and column headers of the transition matrix 300. Accordingly, the second step 302b can include the graphical node elements 304a-304d. As mentioned above, the second step 302b includes a collection of webpages representing the second step in the progression of each website user through the website. In other words, the information included in the transition matrix 300 of FIG. 3A indicates that, for a given period of time, all website users of a given website entered the website via the webpages represented by graphical node elements 304a, 304b, and 304c. From there, all website users of the given website next navigated to the webpages represented by graphical node elements 304a, 304b, 304c, and 304d.

In one or more embodiments, the graphical node element 304d does not represent a webpage. Rather, in the embodiment illustrated in FIG. 3A, the graphical node element 304d represents user fallout. For example, it is expected that once a website user enters a website, the user will eventually leave the website. The point at which a user leaves a website is generally referred to as a "fallout." By analyzing user fallout, a website manager can identify website problems (e.g., broken hyperlinks, incorrectly formatted text, improperly encoded multimedia, poorly worded descriptions, etc.), or places within the website where users quickly lose interest (e.g., webpages without much visual interest, webpages with too much text, etc.). Accordingly, the second step 302b of the transition matrix 300 can include the graphical node element 304d that represents user fallout.

As mentioned above, the visualization manager 104 can place graphical link elements at the intersections of various rows and columns within the transition matrix 300 to indicate node transitions (e.g., hyperlinks between webpages). For example, as shown in FIG. 3A, the visualization manager 104 has included the graphical link elements 306a-306f within the transition matrix 300 at various intersections of the rows associated with the graphical node elements 304a-304c of the first step 302a and the columns associated with the graphical node elements 304a-304d of the second step 302b. As described above, each graphical link element 306a-306f represents at least one website user who transitioned from one of the web pages represented by the graphical node elements 304a-304c of the first step 302a to one of the web pages represented by graphical node elements 304a-304d of the second step 302b via a hyperlink. Accordingly, as illustrated in FIG. 3A: the graphical link element 306a represents at least one website user who navigated from the webpage represented by the graphical node element 304b in the first step 302a to the webpage represented by the graphical node element 304a in the second step 302b. The graphical link element 306b represents at least one website user who navigated from the webpage represented by the graphical node element 304c in the first step 302a to the webpage represented by the graphical node element 304a in the second step 302b. The graphical link element 306c represents at least one website user who navigated from the webpage represented by the graphical node element 304a in the first step 302a to the webpage represented by the graphical node element 304b in the second step 302b. The graphical link element 306d represents at least one website user who navigated from the webpage represented by the graphical node element 304a in the first step 302a to the webpage represented by the graphical node element 304c in the second step 302b. The graphical link element 306e represents at least one website user who navigated from the webpage represented by the graphical node element 304b in the first step 302a to the webpage represented by the graphical node element 304c in the second step 302b. The graphical link element 306f represents at least one website user who navigated from the webpage represented by the graphical node element 304b in the first step 302a to the webpage represented by the graphical node element 304d in the second step 302b. As described above, the graphical link element 306f represents at least one website user who left the website after landing on the webpage represented by the graphical node element 304b in the first step 302a.

The analysis manager 102 can also identify traffic volumes in addition to identifying steps, nodes, and node transitions. As described above, traffic volumes refer to a volume or amount of website users who land on a given webpage, or who traverse a given hyperlink on a webpage. In one or more embodiments, the visualization manager 104 can include visual elements that indicate traffic volumes across the nodes and node transitions included in a transition matrix. For example, in one embodiment and as shown in FIG. 3B, the visualization manager 104 can increase/decrease the size of a graphical node element 304 in order to indicate a volume of user traffic that landed on a webpage represented by that graphical node element. It follows that larger graphical node elements indicate heavier user traffic, while smaller graphical node elements indicate lighter user traffic.

Similarly, in one embodiment and as shown in FIG. 3C, the visualization manager 104 can increase/decrease the size of a graphical link element 306 to indicate a volume of user traffic that traversed a hyperlink represented by that node transition. In one or more embodiments, larger graphical nodes elements and graphical link elements represent greater traffic volumes, while smaller graphical nodes elements and graphical link elements represent smaller traffic volumes. In alternative embodiments, the visualization manager 104 can indicate traffic volumes by changing the color associated with the graphical node elements and graphical link elements of a transition matrix, changing the border associated with the graphical node elements and graphical link elements of a transition matrix, changing a background pattern associated with the graphical node elements and graphical link elements of a transition matrix, etc.

Accordingly, the visualization manager 104 can utilize the visual elements described with reference to FIGS. 3B and 3C in generating a transition matrix in order to visually indicate differences in traffic volume. For example, as illustrated in FIGS. 3D-3G, the visualization manager 104 can include the traffic volume indicating visual elements in the transition matrices 300a, 300b, 300c, and 300d. As shown in FIG. 3D, the transition matrix 300a is made of rows associated with the graphical node elements 304a, 304b, and 304c of the first step 302a, and columns associated with the graphical node elements 304a, 304b, 304c, and 304d of the second step 302b. The visualization manager 104 can indicate traffic volumes for each of the graphical node elements 304a-304d by changing the displayed size of each graphical node element. Accordingly, the webpage associated with the graphical node element 304a in the first step 302a experienced a greater volume of traffic than the webpages associated with the other graphical node elements in the first step 302a. Similarly, the webpage associated with the graphical node element 304b in the second step 302b experienced a greater volume of traffic than the webpages associated with the other graphical node elements in the second step 302b.

Furthermore, as shown in FIG. 3D, the visualization manager 104 can include the traffic volume indicating elements illustrated in FIG. 3C to indicate a volume of user traffic that traversed the hyperlink represented by each of the graphical link elements. For example, as shown in FIG. 3D, the visualization manager 104 has sized the graphical link elements 306b, 306c, 305d, and 306g within the transition matrix 300a to indicate a volume of user traffic that has traversed the hyperlinks associated with the graphical link elements 306b, 306c, 305d, and 306g. Accordingly, the hyperlink associated with the graphical link element 306c between the webpage associated with the graphical node element 304a in the first step 302a and the graphical node element 304b in the second step 302b is the most heavily trafficked hyperlink of all the hyperlinks utilized by the website users between the first step 302a and the second step 302b. Along similar lines, the sizing of the graphical link elements 306b, 306d, and 306g indicate that the hyperlinks associated with these graphical link elements received roughly the same amount of web traffic. As shown in FIG. 3D, the website experienced no user fallout between the first step 302a and the second step 302b.

Figure 3F:
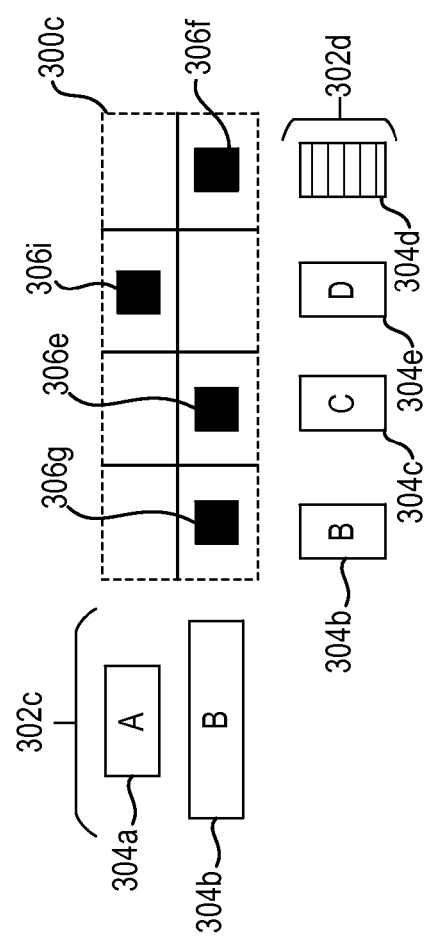

Following this same logic, the visualization manager 104 can indicate traffic volumes in the transition matrices 300b, 300c, and 300d, as illustrated in FIGS. 3E, 3F, and 3G. For example, as shown in FIG. 3E, the webpage associated with the graphical node element 304b received the greatest amount of user traffic in both the second step 302b and the third step 302c. Additionally, the hyperlink associated with the graphical link element 306g from the webpage associated with the graphical node element 304b in the second step 302b to the same graphical node element in the third step 302c received the greatest amount of user traffic. In some embodiments, a large amount of user traffic from webpage in one step to the same webpage in the next step may be explained by a hyperlink on that webpage that directs users to a different area within the same webpage. Also shown in FIG. 3E, the website experience some user fallout between the second step 302b and the third step 302c of users who had landed on the webpage associated with the graphical node element 304b (i.e., the website manager may want to investigate this webpage for possible problems).

The same process continues in FIG. 3F with the transition matrix 300c. As shown, in the third step 302c, the webpage associated with the graphical node element 304b experiences the greatest level of user traffic. Despite this, the user traffic that traversed the graphical link elements 306e, 306f, 306g, 306i and landed on the webpages associated with the graphical node elements 304b, 304c, 304d, and 304e were roughly equal. Accordingly, at this point, the transition matrices 300a, 300b, and 300c in FIG. 3D-3F indicate that during a period of time and after three hyperlink clicks within the given website, all website users have either fallen out, or have landed on one of the webpages associated with the graphical node elements 304b, 304c, or 304e.

Next, in FIG. 3G, the graphical link elements 306f, 306j, 306k from the graphical node elements 304b, 304c, and 304e of the third step 302d indicate that all website users have fallen out of the website (as indicated by the graphical node element 304d). Put another way, for the period of time covered by the transition matrices 300a-300d, all website users fall out of the website (i.e., leave the website) within three hyperlink clicks. This information may be valuable to a website manager who is trying to determine what kinds of content a website user views before leaving the website. This information may also be helpful for a website manager who is trying to identify a broken hyperlink or other website malfunction.

Figure 3H:
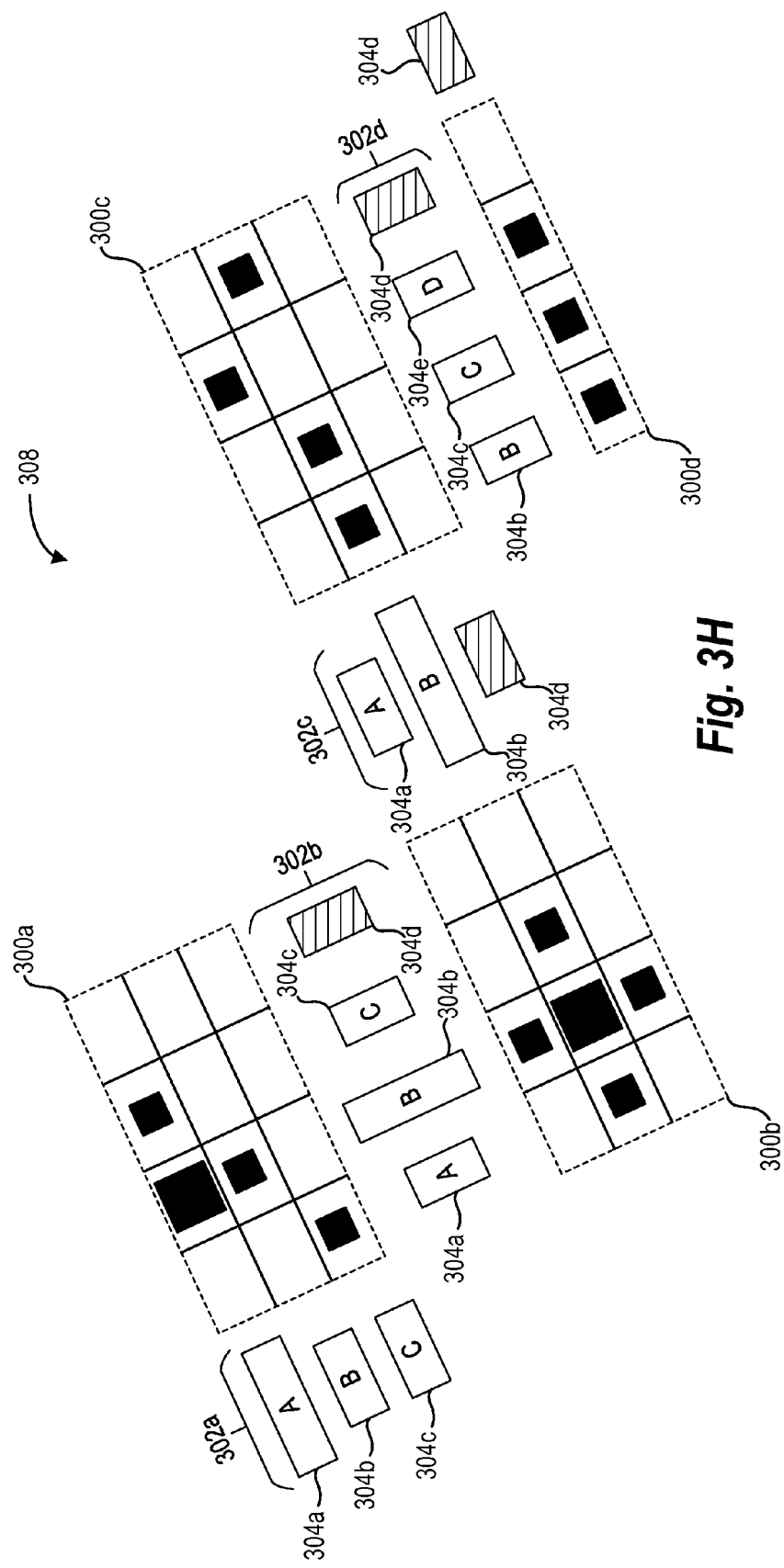

As mentioned above, although the visualization manager 104 can include helpful information in a transition matrix, it is difficult for a website manager to get a sense of how website user progress through the webpages of the website in an event sequence. Accordingly, rather than individually presenting multiple transition matrices illustrating various steps in one or more user event sequences, the visualization manager 104 can generate a matrix wave. For example, as shown in FIG. 3H, the visualization manager 104 can generate the matrix wave 308. The matrix wave 308 can include the transition matrices 300a, 300b, 300c, and 300d discussed above with reference to FIGS. 3D, 3E, 3F, and 3G, respectively.

As illustrated in FIG. 3H, in order to generate the matrix wave 308, the visualization manager 104 can concatenate several transition matrices together. In one or more embodiments, the visualization manager 104 accomplishes this concatenation by rotating each of the transition matrices 300a-300d and concatenating the transition matrices 300a-300d along their common steps. For example, as discussed above, the columns of the transition matrix 300a as shown in FIG. 3D are associated with the graphical node elements 304a-304d of the second step 302b. Similarly, as shown in FIG. 3E, the rows of the transition matrix 300b are also associated with the second step 302b. In one or more embodiments, the visualization manager 104 does not include the fallout graphical node element 304d among the rows of a transition matrix as it would make no sense for a website user to both land on a webpage of a website and simultaneously leave the website.

Because the columns of the transition matrix 300a and the rows of the transition matrix 300b are associated with the second step 302b, the visualization manager 104 can concatenate the two matrices along the second step 302b. As shown in FIG. 3H, the visualization manager 104 can rotate both the transition matrix 300a and the transition matrix 300b. Additionally, the visualization manager 104 can concatenate the transition matrix 300a and the transition matrix 300b along the second step 302b such that the columns of the transition matrix 300a become the rows of the transition matrix 300b in a zig-zag pattern. Following this, the visualization manager 104 can rotate and concatenate the transition matrices 300c and 300d to the matrix wave 308 along the common steps (i.e., the visualization manager 104 concatenates the transition matrices 300b and 300c along the third step 302c, and visualization manager 104 concatenates the transition matrices 300c and 300d along the fourth step 302d). As shown in FIG. 3H, the visualization manager 104 may add rows and/or columns to the matrices 300a-300d in the matrix wave 308 that correspond to the fallout graphical node element 304d.

Accordingly, once the visualization manager 104 has generated the matrix wave 308, a web manager can easily understand how website users have progressed through a given website over a period of time. For example, as shown in FIG. 3H, a web manager viewing the matrix wave 308

(e.g., via a display of the client computing device 110d) can quickly see that within three hyperlink clicks and over a given period of time, all website users fall out of the website. The web manager can also easily determine that there are very popular hyperlinks on the webpages associated with graphical node elements 304a and 304b. Furthermore, the web manager can quickly see that no website users fall out of the website after initially landing on the webpages associated with the graphical node elements 304a, 304b, and 304c (in the first step 302a). The website manager can quickly and easily assess this information as there are no overlapping or sloppy edges, as are common in existing analysis visualization tools.

Figure 3I:
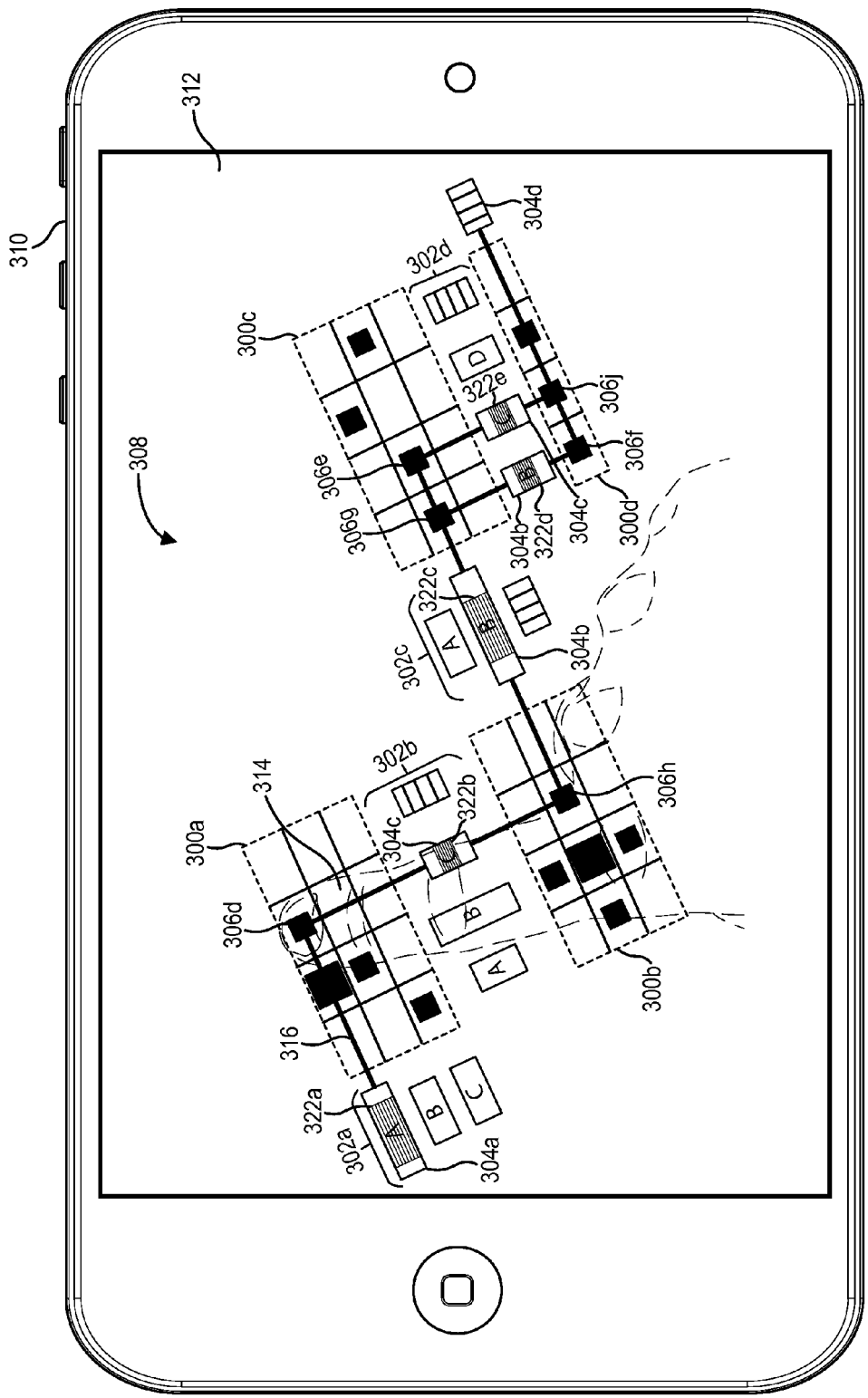

As mentioned above, the visualization manager 104 can provide the matrix wave 308 to the client computing device 110d for display by the display manager 204. For example, as shown in FIG. 3I, the display manager 204 can display the matrix wave 308 on a display 312 of a computing device 310. In the embodiment illustrated, the computing device 310 is a tablet computer and the display 312 is a touch screen display. In alternative embodiments, the computing device 310 can be another type of computing device (i.e., a desktop computer, a laptop computer, a smartphone, a personal digital assistant, etc.), and the display 312 can be a different type of display (i.e., a standard computer monitor, etc.).

Also as mentioned above, the visualization manager 104 can provide the matrix wave 308 such that the elements of the matrix wave (i.e., the transition matrices, graphical node elements, graphical link elements, etc.) are interactive. For example, as shown in FIG. 3I, a user can perform a touch gesture in connection with the matrix wave 308 via the finger 314. In one or more embodiments, this touch gesture can be detected by the input detector 206 and reported by the visualization application 202 to the visualization manager 104. In response to the detected interaction with the matrix wave 308, the visualization manager 104 can update or alter the matrix wave 308.

For example, in response to a detected touch gesture by the user's finger 314 with the graphical link element 306d, the visualization manager 104 can update the matrix wave 308 to include an event sequence trace line. As shown in FIG. 3I, the event sequence trace line 316 highlights a path from the first step 302a through the matrix wave 308 until either a fallout, or the end of the matrix wave 308. Accordingly, the visualization manager 104 generates the event sequence trace line 316 by first identifying the row and column associated with the graphical link element 306d (i.e., display element the finger 314 is interacting with), and highlights the graphical node elements 304a and 304c associated with the identified row and column. Next, the visualization manager 104 draws edges connecting the graphical node element 304a in the first step 302a to the graphical link element 306d, and connecting the graphical link element 306d to the graphical node element 304c in the second step 302b.

Following this, the visualization manager 104 continues generating the event sequence trace line 316 by identifying all graphical link elements in the row of the transition matrix 300b associated with the graphical node element 304c in the second step 302b. Once the visualization manager 104 identifies the graphical link element 306h in the row associated with the graphical node element 304c of the second step 302b in the transition matrix 300b, the visualization manager 104 can then identify a column associated with the graphical link element 306h, and highlight the associated graphical node element 304b in the third step 302c. Next, the visualization manager 104 can draw edges connecting the graphical node element 304c in the second step 302b to the graphical link element 306b, and connecting the graphical link element 306b to the graphical node element 304b in the third step 302c.

In response to encountering a row in the transition matrix 300c that includes more than one graphical link element 306 associated with the graphical node element 304b of the third step 302c, the visualization manager 104 can split the event sequence trace line 316. For example, as shown in FIG. 3I, the visualization manager 104 can identify the relevant graphical node element 304b in the third step 302c, and the graphical node elements 304b and 304c in the fourth step 302d. Following this, the visualization manager 104 can draw the edges between these graphical node elements and graphical link elements such that the event sequence trace line 316 splits through the graphical link elements 306g and 306e. Next, the visualization manager 104 terminates the event sequence trace line 316 in the transition matrix 300d at the fallout graphical node element 304d, through graphical link elements 306f and 306j. Accordingly, by simply tapping on one graphical link element in the matrix wave 308, the user can be provided with a full event sequence for all website users who clicked through the hyperlink associated with that graphical link element.

Additionally, the visualization manager 104 can indicate how path-specific traffic volume compares to the aggregate traffic volume. For example, as shown in FIG. 3I, the visualization manager 104 can overlay the path-specific traffic volume indicators 322a, 322b, 322c, 322d, and 322e over the graphical node elements included along the event sequence trace line 316 (i.e., the graphical node element 304a in the first step 302a, the graphical node element 304c in the second step 302b, the graphical node element 304b in the third step 302c, and the graphical node elements 304b and 304c in the third step 302d). In one or more embodiments, the path-specific traffic volume indicators 322a-322e show how the path-specific traffic volume compares relative to the aggregate traffic volume. For example, in the first step 302a, the path-specific traffic volume indicator 322a indicates that the traffic volume associated with the event sequence trace line 316 accounts for over half of the total volume that goes through the graphical node element 304a.

The visualization manager 104 can also provide additional functionality in response to other types of detected interactions with the displayed matrix wave 308. For example, in one embodiment, the visualization manager 104 may provide a pop-up window (not shown) containing statistics and analysis data in response to a tap-and-hold touch gesture including a graphical node element or graphical link element. If the visualization manager 104 is providing the matrix wave 308 via a computer display, the visualization manager 104 can provide graphical node element information in response to a mouse-hover. Similarly, in response to a tap-and-hold or mouse-hover over a graphical node element or a graphical link element, the visualization manager 104 can provide information about graphical node elements connected to a graphical link element, and vice versa.

In another embodiment, the visualization manager 104 may provide a preview (not shown) of the webpage associated with a particular graphical node element in response to a double-tap touch gesture including that graphical node element. In yet another embodiment, the visualization application 202 may provide additional controls (not shown) that allow the user to select specific log files for inclusion in the matrix wave 308, to search for specific web page names or group names, to configure the period of time illustrated within the matrix wave 308, to pan through the matrix wave 308, to zoom in/zoom out on the matrix wave 308, etc. Furthermore, the visualization manager 104 can also collapse the matrix wave 308 so as to only display the initial and final matrices, rather than displaying all matrices in the matrix wave 308. The visualization manager 104 can also provide controls that allow a user to filter certain graphical node elements, graphical link elements, and/or steps. Additionally, the visualization manager 104 can also provide controls that allow a user to filter graphical node and link elements by volume. Finally, the visualization manager 104 can provide controls that allow a user to filter web pages according to their organization in a website using a tree-structured page listing.

Furthermore, the visualization manager 104 can sort graphical node elements alphabetically, by volume, or difference across a single step or across all steps in the matrix wave 308. In at least one embodiment, the visualization manager 104 can add proxy graphical node elements to one or more steps within the matrix wave 308 such that one or more steps in the matrix wave 308 contains the same graphical node elements. For example, as shown in FIG. 3I, the visualization manager 104 can add the graphical node element 304c (i.e., "C") to the step 302c, such that the step 302c has the same graphical node elements as the steps 302a and 302b. By including proxy graphical node elements, the visualization manager 104 can create a matrix wave that may be large and sparse, but easier to use in terms of getting an overview of the entire website and tracing a particular segment of traffic across multiple steps.

Furthermore, in one embodiment, the visualization manager 104 can provide controls that allow a user to fix the ordering of graphical node elements in one step and propagate this ordering across steps in order to facilitate comparison across steps. In particular, a user can provide a desired order that the system propagates across steps to allow for more detailed analysis. For example, if a user in interested in a step 2 with the order of A, B, D, C, the user can provide input indicating the order. In response, the system can set the other steps with the same order to facilitate comparison.

As mentioned above, the analysis manager 102 can provide analyses to the visualization manager 104 for more than one data set. For example, in one or more embodiments, a website manager may wish to compare website data for one period of time against data from the same website for another period of time. The website manager may wish to perform this comparison after changing the layout of various webpages within a website. In that case, a comparison of website data collected before the layout changes against website data collected after the layout changes can provide the website manager with valuable insights into how website users react to the layout changes. For instance, a comparison of the two datasets may bring to the website manager's attention a decrease in website traffic within the webpages that have been changed, or an increase to website traffic to a help forum following visits to the webpages that have been changed, etc. This information can indicate to the website manager that the layout changes have not been successfully received by a significant portion of the website's users.

In response to receiving a request to compare two data sets, the analysis manager 102 can identify steps, graphical node elements, graphical link elements, and traffic volumes from log files that cover two separate periods of time indicated by a user, as described above. The visualization manager 104 can then generate a visualization that provides the user with an accurate depiction how the sets of event sequence data compare to each other. For example, as illustrated in FIG. 3J, the visualization manager 104 can provide the matrix wave 308 with additional components indicating how one data set compares to the other.

As used herein, the visualization manager 104 can compare data sets based on changes to traffic volume over time. For example, in a first data set the traffic volume across a particular graphical link element (i.e., a hyperlink on a webpage) may be lower than the traffic volume across the same graphical link element in a second data set. Accordingly, the visualization manager 104 can add a visual indicator to that particular graphical link element within the matrix wave 308 that indicates an increase in traffic volume. In additional or alternative embodiments, the visualization manager 104 can compare data sets based on other criteria, such as changes to user activity (e.g., multimedia interactions) on a particular webpage, changes to file requests originating at a particular webpage, etc.

Figure 3J:
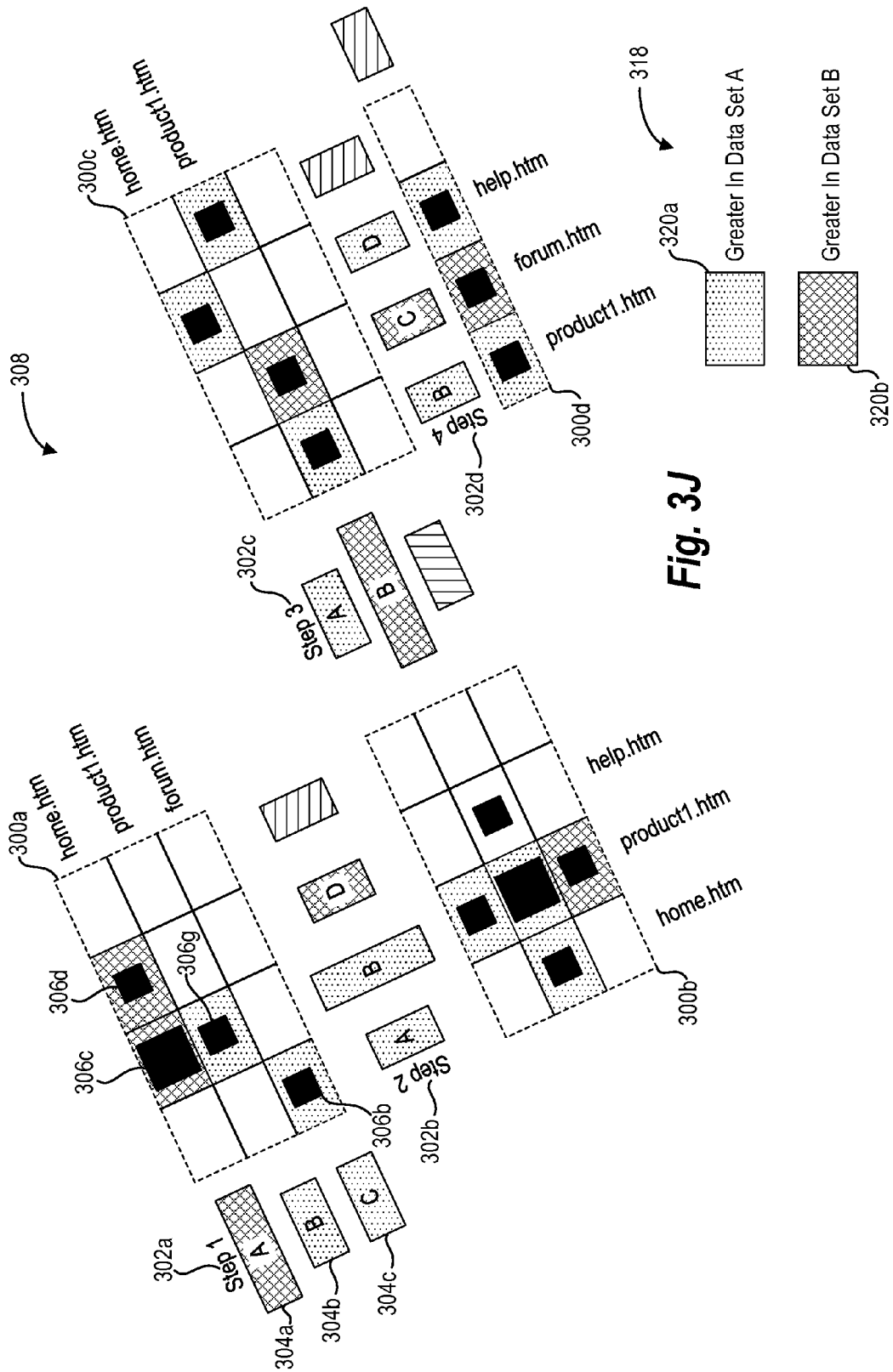

To illustrate, as shown in FIG. 3J, the visualization manager 104 can include a comparison key 318 in addition to the matrix wave 308. The comparison key 318 can include key elements 320a and 320b that illustrate to a user how a first data set differs from a second data set. For example, as shown in FIG. 3J, the key element 320a indicates that the traffic volume associated with any graphical node element or graphical link element featuring a dotted background is greater in "Data Set A" (i.e., the first data set). In other words, any graphical node element or graphical link element featuring a dotted background has experienced a decrease in traffic volume between the first data set and the second data set. Along similar lines, the key element 320b indicates that the traffic volume associated with any graphical node element or graphical link element featuring a crosshatched background is greater in "Data Set B" (i.e., the second data set). Thus, any graphical node element or graphical link element featuring a crosshatched background has experienced an increase in traffic volume between the first data set and the second data set.

Figure 3K:
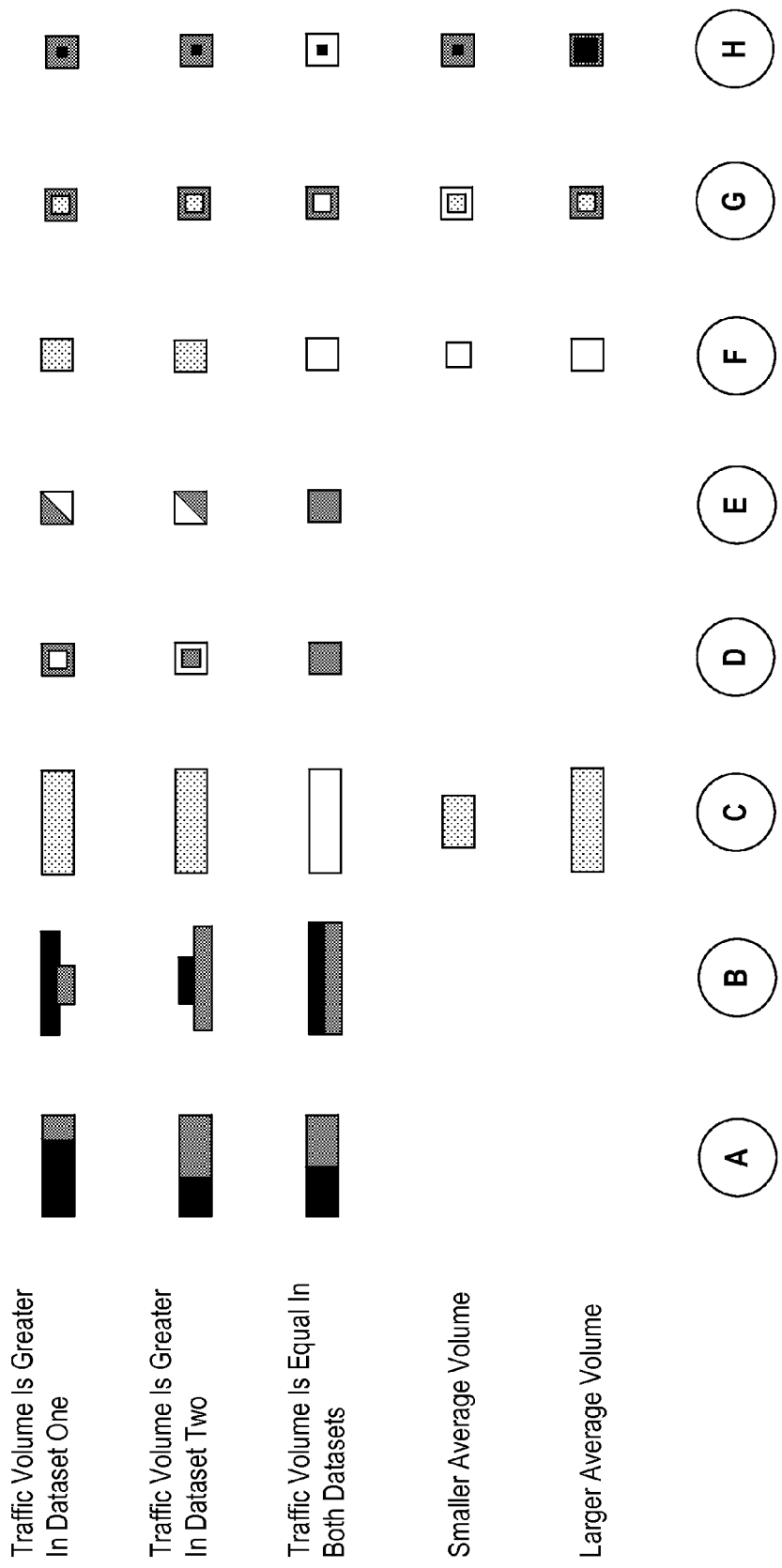

In additional or alternative embodiments, the matrix wave 308 can include more sophisticated encodings to explicitly show traffic volume differences between data sets. The visualization manager 104 can utilize various approaches for visual comparison including: juxtaposition, superimposition, explicit encoding, and animation. Superimposition is discussed above with reference to FIG. 3C. With reference to juxtaposition based comparisons, as shown in FIG. 3K the visualization manager 104 can juxtapose a graphical node element representing a web page in a first data set with a graphical node element representing the same web page in a second data set. As shown in column "a" in FIG. 3K, the visualization manager 104 can align the juxtaposed graphical node elements along a center line. Alternatively, as shown in column "b" in FIG. 3K, the visualization manager 104 can position the juxtaposed graphical node elements side-by-side. Furthermore, as shown in column "c" in FIG. 3K, the visualization manager 104 can explicitly encode comparison data by mapping traffic volume differences to a diverging pattern or color scheme. For example, greater traffic volume differences can be mapped to highly saturated colors or densely concentrated patterns, while lesser traffic volume differences can be mapped to less saturated colors or sparsely concentrated patterns.

Additionally, the visualization manager 104 can similarly show traffic volume differences between data sets among graphical link elements of a matrix wave. For example, as described above and as illustrated in column "h" of FIG. 3K, the visualization manager 104 can utilize the size of the inner square of the graphical link element to represent average link volume, while the background color or pattern represents differences in traffic volume between data sets. Alternatively, the visualization manager 104 can encode this same information using an alternate color/pattern scheme, as shown in columns "d" and "g" of FIG. 3K, an inner triangle rather than an inner square, as shown in column "e" of FIG. 3K, only colors/patterns, as shown in column "f" of FIG. 3K. In one or more embodiments, the visualization manager 104 can utilize animation to illustrate traffic volume differences between two data sets by animating a size change of a graphical node element or graphical link element, or animating a color change of a graphical node element or graphical link element.

Again with reference to FIG. 3J, the visualization manager 104 has indicated changes in traffic volume among the graphical node elements associated with the first step 302, the second step 302b, the third step 302c, and the fourth step 302d. For example, in the first step 302a, the visualization manager 104 can indicate that the webpage associated with the graphical node element 304a has experienced an increase in traffic volume from the first data set to the second data set. Similarly, the visualization manager 104 can also indicate that the webpages associated with the graphical node elements 304b and 304c have experienced a decrease in traffic volume from the first data set to the second data set. In one or more embodiments, the visualization manager 104 can indicate changes in traffic volume among the webpages associated with the graphical node elements of the second step 302b, the third step 302c, and the fourth step 302d in a similar manner, as shown. Additionally, the visualization manager 104 can also include webpage labels associated with the graphical node elements of the first step 302a, the second step 302b, the third step 302c, and the fourth step 302d, as shown in FIG. 3J.

Furthermore, also as shown in FIG. 3J, the visualization manager 104 can indicate that the hyperlinks associated with the graphical link elements 306c and 306d have experienced an increase in traffic volume from the first data set to the second data set. Also, the visualization manager 104 can indicate that the hyperlinks associated with the graphical link elements 306b and 306g have experienced a decrease in traffic volume from the first data set to the second data set. In one or more embodiments, the visualization manager 104 can indicate changes in traffic volume traversing the hyperlinks associated with the graphical link elements of the transition matrices 300b, 300c, and 300d in a similar manner, as shown.

In additional or alternative embodiments, the visualization manager 104 can indicate changes in traffic volume in other way. For example, in one alternative embodiment, the visualization manager 104 can indicate additional granularity within the comparison illustrated by the matrix wave 308 by displaying the dotted and crosshatched backgrounds patterns more densely to indicate a greater difference between the two data sets. For example, in response to the webpage associated with the graphical node element 304a of the first step 302a experiencing a much greater amount of traffic volume in the second data set, the visualization manager 104 may display a more densely populated crosshatched background pattern. Along similar lines, in response to the webpage associated with the graphical node element 304a of the first step 302a experiencing on a slighter greater amount of traffic volume in the second data set, the visualization manager 104 may display a very loosely populated crosshatched background pattern. In additional embodiments, the visualization manager 104 may utilize alternative patterns than those displayed in FIG. 3J.

In another alternative embodiment, the visualization manager 104 may indicate changes in traffic volume by adding a first color to the background of graphical node elements and graphical link elements that have experienced an increase in traffic volume across data sets, and adding a second color to the background of graphical node elements and graphical link elements that have experienced a decrease in traffic volume across data sets. Additionally, the visualization manager 104 can indicate changes in traffic volume by utilizing a color gradient, such that a greater increase/decrease of traffic volume is indicated by the color in a darker hue, while a lesser increase/decrease of traffic volume is indicated by the color in a lighter hue.

Furthermore, in alternative embodiments, the visualization manager 104 can indicate changes in traffic volume across an entire sequence of webpage clicks. For example, the web manager may be interested in analyzing changing in traffic volume among website users who visit "homepage.htm," "product1.htm," "product3.htm," and "purchase.htm," in that order. Accordingly, in response to the web manager indicating this ordered sequence of webpage, the visualization manager 104 can provide an indication of changed in traffic volume across this sequence between two periods of time.

Figure 4:
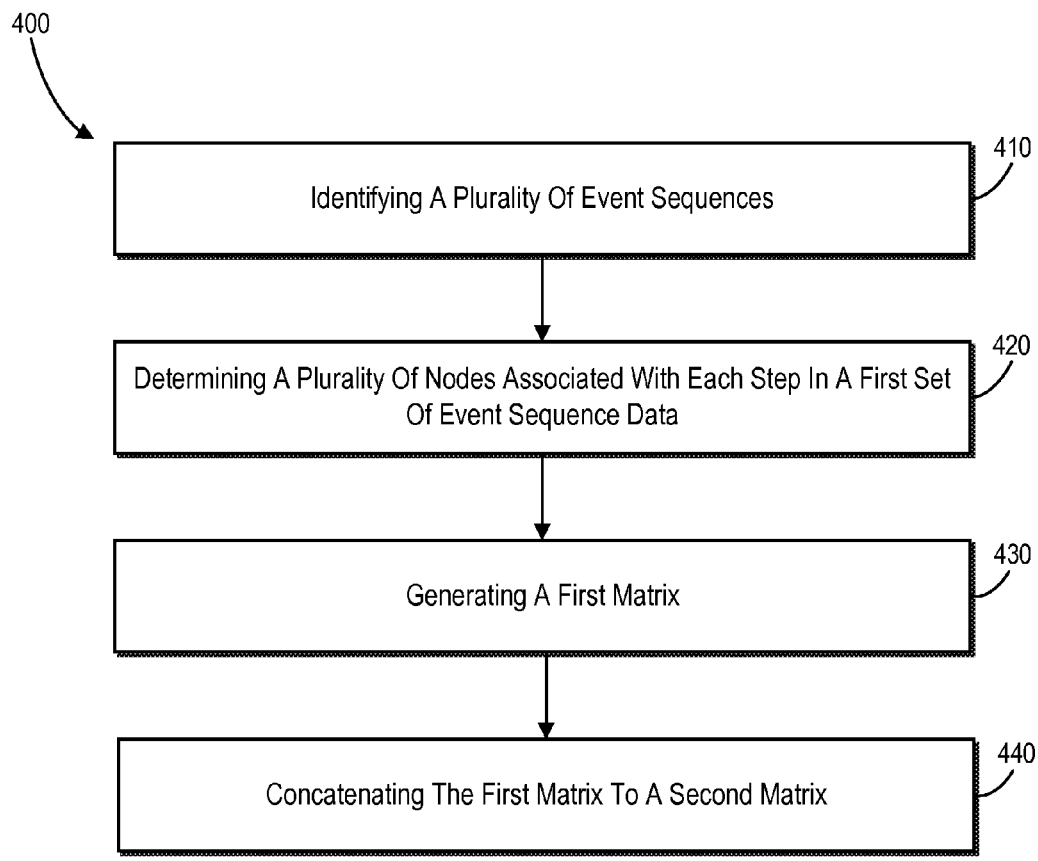
FIG. 4 illustrates a flowchart of a series of acts in a method of providing a visualization of event sequence data.
Figure 5:
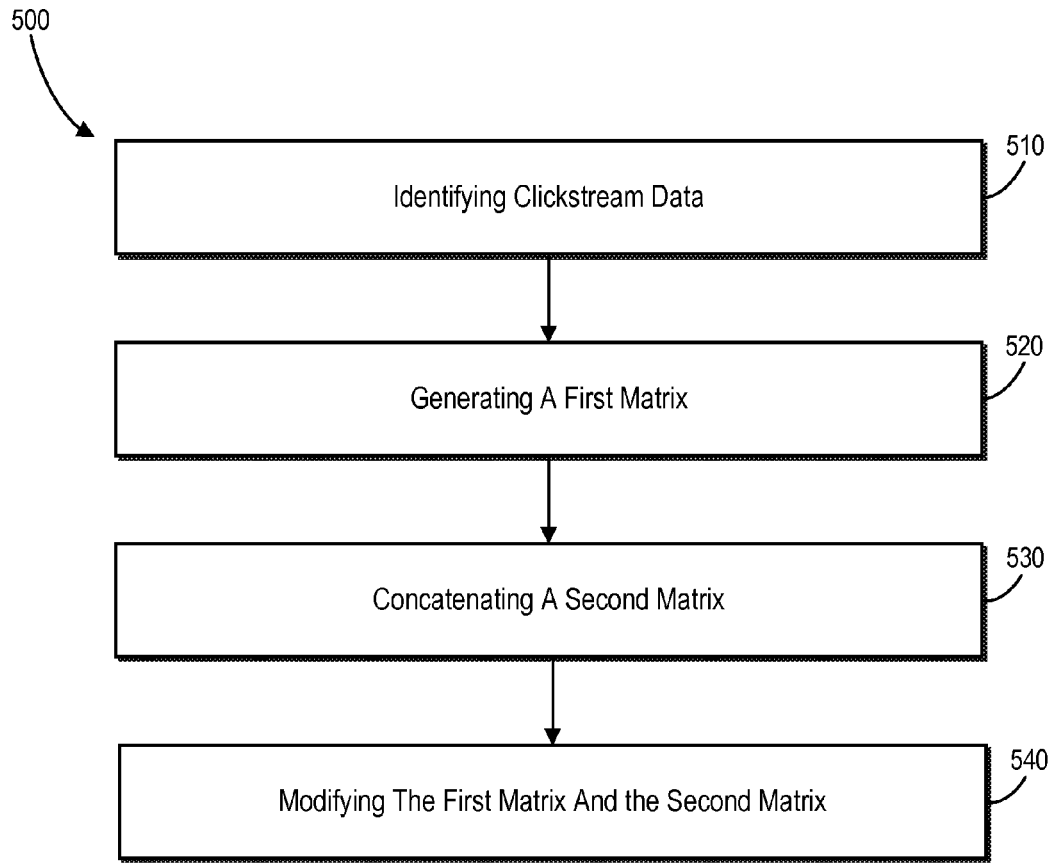
FIG. 5 illustrates a flowchart of a series of acts in a method of providing a visualization of event sequence data.

FIGS. 1-3K, the corresponding text, and the examples, provide a number of different systems and devices for providing visualizations of event sequence data and event sequence data comparisons. In addition to the foregoing, one or more embodiments can also be described in terms of flowcharts comprising acts and steps in a method for accomplishing a particular result. For example, FIGS. 4 and 5 illustrate flowcharts of exemplary methods in accordance with one or more embodiments. The methods described in relation to FIGS. 4 and 5 may be performed with less or more steps/acts or the steps/acts may be performed in differing orders. Additionally, the steps/acts described herein may be repeated or performed in parallel with one another or in parallel with different instances of the same or similar steps/acts.

FIG. 4 illustrates a flowchart of one example method 400 of providing a visualization of event sequence data. The method 400 includes an act 410 of identifying a plurality of event sequences. In particular, the act 410 can involve identifying a plurality of event sequences from a first set of event sequence data, the plurality of event sequences comprising event sequences with first steps, second steps, and third steps. For example, in one or more embodiments, identifying the first steps, the second steps, and the third steps within the plurality of event sequences further includes identifying the first steps, the second steps, and the third steps within a time period within the plurality of event sequences.

The method 400 further includes an act 420 of determining a plurality of nodes associated with each step in a first set of event sequence data. In particular, the act 420 can involve determining, from within the first set of event sequence data, a plurality of events associated with the first steps, a plurality of events associated with the second steps, and a plurality of events associated with the third steps. In one or more embodiments, each of the plurality of events associated with the first step, the second step, and the third step are representative of users visiting one or more webpages of a website.

Additionally, the method 400 includes an act 430 of generating a first matrix. In particular, the act 430 can involve generating, by the at least one processor, a first matrix representing the first steps and transitions to the second steps from the first set of event sequence data, the first matrix comprising a first plurality of graphical node elements representing the plurality of events associated with the first steps aligned with rows of the first matrix, a second plurality of graphical node elements representing the plurality of events associated with the second steps aligned with columns of the first matrix, and a first plurality of graphical link elements, wherein each of the first plurality of graphical link elements represents a transition from an event in a first step represented by a graphical node element in a row of the first matrix to an event in a second step represented by a graphical node element in a column of the first matrix and is positioned at an intersection of the row the first matrix and the column of the first matrix. In one or more elements, a graphical node element is representative of an event (i.e., a web page visit). Additionally, in one or more embodiments, a graphical link element is representative of a hyperlink that, when clicked, directs a user from one webpage to another webpage.

Furthermore, the method 400 includes an act 440 of concatenating the first matrix to a second matrix. In particular, the act 440 can involve concatenating, by the at least one processor, a second matrix representing the second steps and transitions to the third steps from the first set of event sequence data to the first matrix in a zig-zag pattern by aligning the second plurality of graphical node elements representing the plurality of events associated with the second steps with columns for the second matrix and providing the second matrix with a third plurality of graphical node elements representing the plurality of events associated with the third steps aligned with rows of the second matrix, the second matrix comprising second plurality of graphical link elements, wherein each of the second plurality of graphical link elements represents a transition from an event in a second step represented by a graphical node element in a column of the second matrix to an event in a third step represented by a graphical node element in a row of the second matrix and is positioned at an intersection of the row of the second matrix and the column of the second matrix. In one or more embodiments, the method 400 further includes providing the graphical node elements of the first, second, and third plurality of graphical node elements with a visual indicator representing a step volume associated with each of the events represented by the graphical node elements. Additionally, in at least one embodiment, providing the graphical node elements with a visual indicator representing a step volume associated with each of the events represented by the graphical node elements comprises modifying sizes of the graphical node elements.

The method 400 can also include the acts of identifying a plurality of event sequences from a second set of event sequence data, the plurality of event sequences comprising event sequences with first steps, second steps, and third steps; modifying the first matrix to additionally represent the first steps and transitions to the second steps from the second set of event sequence data; and modifying the second matrix to additional represent the second steps and transitions to the third steps from the second set of event sequence data. In one or more embodiments, modifying the first and second matrices comprises modifying the graphical link elements and the graphical node elements to represent both the first and second sets of event sequence data using one of juxtaposition, superimposition, explicit encoding, or animation.

Furthermore, in one or more embodiments, the method 400 can include the act of providing the graphical link elements of the first and second plurality of graphical link elements with a visual indicator representing a transition volume associated with transition represented by the graphical link elements. In one or more embodiments, providing the graphical link elements of the first and second plurality of graphical link elements with a visual indicator comprises one or more of adding a color, changing a size, adding a pattern, or adding a partial fill-in to the graphical link elements. In at least one embodiment, modifying the first and second matrices comprises modifying the graphical link elements and the graphical node elements of the first and second matrices using a diverting color scheme that uses a first color to represent the first set of event sequence data and a second color to represent the second set of event sequence data. For example, modifying the first and second matrices can further comprise modifying the graphical link elements and the graphical node elements using a color-scale to represent relative difference and percentage difference. In at least one embodiment, modifying the first and second matrices can also further comprise modifying sizes of the graphical link elements and the graphical node elements to represent average volume.

FIG. 5 illustrates a flowchart of an example method 500 of providing a visualization of event sequence data. The method 500 includes an act 510 of identifying clickstream data. In particular, the act 510 can involve identifying a first set of clickstream data for a website and a second set of clickstream data for the website. For example, in at least one embodiment, the first set of clickstream data represents web traffic to the website during a first period of time and the second set of clickstream data represents web traffic to the website during a second period of time differing from the first period of time. In one or more embodiments, the act of identifying a first set of clickstream data and a second set of clickstream data can be done automatically without human intervention.

The method 500 also includes an act 520 of generating a first matrix. In particular, the act 520 can involve generating a first matrix representing first steps and transitions to second steps from both the first and second sets of clickstream data for the website, the first matrix comprising a first plurality of graphical node elements representing the plurality of events associated with the first steps aligned with rows of the first matrix and a second plurality of graphical node elements representing the plurality of events associated with the second steps aligned with columns of the first matrix.

The method 500 further includes an act 530 of concatenating a second matrix. In particular, the act 530 can involve concatenating a second matrix representing the second steps and transitions to third steps from both the first and second sets of clickstream data for the website to the first matrix in a zig-zag pattern by using the second plurality of graphical node elements representing the plurality of events associated with the second steps as columns for the second matrix and providing the second matrix with a third plurality of graphical node elements representing the plurality of events associated with the third steps in rows of the second matrix. In one or more embodiments, the method 500 can also include: placing the first plurality of graphical node elements on a first side of the first matrix as row headers; placing event descriptions on a second opposing side of the first matrix, the event descriptions providing an indication of events associated with each of the first steps represented by the first plurality of graphical node elements; placing the first plurality of graphical node elements on a third side of the first matrix and on a first side of the second matrix as column headers for both the first matrix and the second matrix; and placing event descriptions on a second opposing side of the second matrix, the event descriptions providing an indication of events associated with each of the second steps represented by the first plurality of graphical node elements.

The method 500 also includes an act 540 of modifying the first matrix and the second matrix. In particular, the act 540 can involve modifying a characteristic of the first plurality of graphical node elements, the second plurality of graphical node elements, and the third plurality of graphical node elements to indicate web traffic from the first set of clickstream data and web traffic from the second set of clickstream data. For example, in one or more embodiments, the method 500 can include: sizing each graphical node element of the first plurality of graphical node elements to indicate a first volume of web traffic of the associated first steps of both the first and second sets of clickstream data; and sizing each graphical node elements of the second plurality of graphical node elements to indicate a second volume of web traffic of the associated second steps of both the first and second sets of clickstream data. Furthermore, in at least one embodiment, modifying the characteristic of the first plurality of graphical node elements, the second plurality of graphical node elements, and the third plurality of graphical node elements to indicate web traffic from the first set of clickstream data and web traffic from the second set of clickstream data comprises associated a first color with the first set of clickstream data and a second color with the second set of clickstream data and adjusting a hue of the graphical node elements to indicate a relative difference between the web traffic from the first set of clickstream data and the web traffic from the second set of clickstream data.

In one or more embodiments, the method 500 can also include the acts of providing a first plurality of graphical link elements in the first matrix, wherein each of the first plurality of graphical link elements represents a transition from an event in a first step represented by a graphical node element in a row of the first matrix to an event in a second step represented by a graphical node element in a column of the first matrix and is positioned at an intersection of the row the first matrix and the column of the first matrix; and providing a second plurality of graphical link elements in the second matrix, wherein each of the second plurality of graphical link elements represents a transition from an event in a second step represented by a graphical node element in a column of the second matrix to an event in a third step represented by a graphical node element in a row of the second matrix and is positioned at an intersection of the row of the second matrix and the column of the second matrix. Additionally, in at least one embodiment, the method 500 can include the acts of: detecting a selection of a graphical node element of the first plurality of graphical node elements in the first matrix; and highlighting paths from the selected graphical node element to graphical node elements of the second plurality of graphical node elements associated with events performed after first performing the event associated with the selected graphical node element, the paths indicating paths of visitors through the website that started at a webpage associated with the selected graphical node element. Finally, in at least one embodiment, the method 500 can also include adding an indicator representing path-specific web traffic volume to the graphical node elements of the second plurality of graphical node elements compared to overall web traffic volume to the graphical node elements of the second plurality of graphical node elements.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
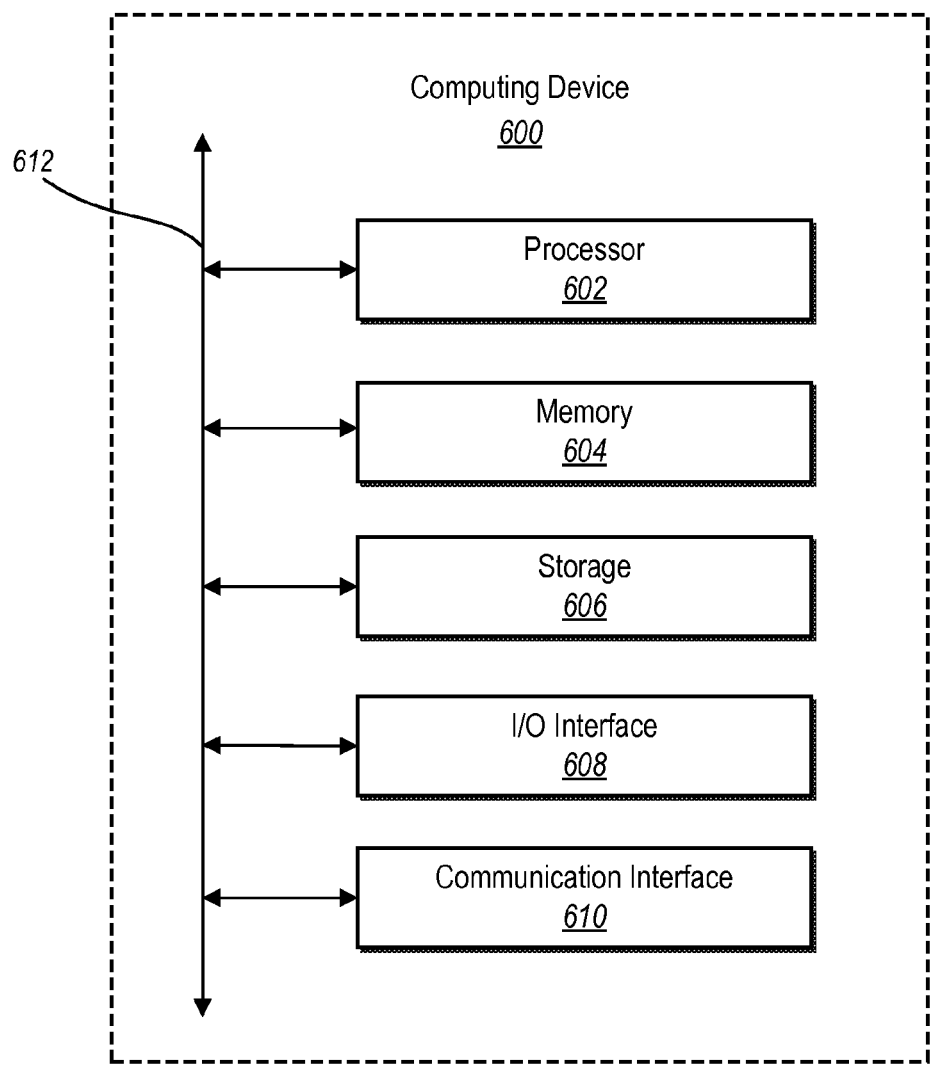
FIG. 6 illustrates a block diagram of an exemplary computing device in accordance with one or more embodiments.

FIG. 6 illustrates a block diagram of an exemplary computing device 600 that may be configured to perform one or more of the processes described above. One will appreciate that the analysis and visualization system may be implemented by one or more computing devices such as the computing device 600. As shown by FIG. 6, the computing device 600 can comprise a processor 602, memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In particular embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In particular embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, the storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In particular embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from the computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for presenting an interactive visualization of event sequence data, a method for providing an analysis of one or more data sets comprising:

identifying, by at least one processor, a plurality of event sequences from a first set of event sequence data, the plurality of event sequences comprising event sequences with first steps, second steps, and third steps;

determining, by the at least one processor and from within the first set of event sequence data, a plurality of events associated with the first steps, a plurality of events associated with the second steps, and a plurality of events associated with the third steps;

generating, by the at least one processor, a first matrix representing the first steps and transitions to the second steps from the first set of event sequence data, the first matrix comprising a first plurality of graphical node elements representing the plurality of events associated with the first steps aligned with rows of the first matrix, a second plurality of graphical node elements representing the plurality of events associated with the second steps aligned with columns of the first matrix, and a first plurality of graphical link elements, wherein each of the first plurality of graphical link elements represents a transition from an event in a first step represented by a graphical node element in a row of the first matrix to an event in a second step represented by a graphical node element in a column of the first matrix and is positioned at an intersection of the row the first matrix and the column of the first matrix; and concatenating, by the at least one processor, a second matrix representing the second steps and transitions to the third steps from the first set of event sequence data to the first matrix in a zig-zag pattern by aligning the second plurality of graphical node elements representing the plurality of events associated with the second steps with columns for the second matrix and providing the second matrix with a third plurality of graphical node elements representing the plurality of events associated with the third steps aligned with rows of the second matrix, the second matrix comprising second plurality of graphical link elements, wherein each of the second plurality of graphical link elements represents a transition from an event in a second step represented by a graphical node element in a column of the second matrix to an event in a third step represented by a graphical node element in a row of the second matrix and is positioned at an intersection of the row of the second matrix and the column of the second matrix.

2. The method as recited in claim 1, further comprising providing the graphical node elements of the first, second, and third plurality of graphical node elements with a visual indicator representing a step volume associated with each of the events represented by the graphical node elements.

3. The method as recited in claim 2, wherein providing the graphical node elements with a visual indicator representing a step volume associated with each of the events represented by the graphical node elements comprises modifying sizes of the graphical node elements.

4. The method as recited in claim 2, further comprising:
identifying a plurality of event sequences from a second set of event sequence data, the plurality of event sequences comprising event sequences with first steps, second steps, and third steps;
modifying the first matrix to additionally represent the first steps and transitions to the second steps from the second set of event sequence data; and
modifying the second matrix to additional represent the second steps and transitions to the third steps from the second set of event sequence data.

5. The method as recited in claim 4, wherein modifying the first and second matrices comprises modifying the graphical link elements and the graphical node elements to represent both the first and second sets of event sequence data using one of juxtaposition, superimposition, explicit encoding, or animation.

6. The method as recited in claim 1, further comprising providing the graphical link elements of the first and second plurality of graphical link elements with a visual indicator representing a transition volume associated with transition represented by the graphical link elements.

7. The method as recited in claim 6, wherein providing the graphical link elements of the first and second plurality of graphical link elements with a visual indicator comprises one or more of adding a color, changing a size, adding a pattern, or adding a partial fill-in to the graphical link elements.

8. In a digital medium environment for presenting an interactive analysis of sequence data, a system for providing an analysis of one or more data sets comprising:
at least one processor; and
at least one non-transitory computer-readable storage medium storing instructions thereon that, when executed by the at least one processor, cause the system to:
identify a plurality of event sequences form a first set of event sequence data, the plurality of event sequences comprising event sequences with first steps, second steps, and third steps;
determine from within the first set of event sequence data, a plurality of events associated with the first steps, a plurality of events associated with the second steps, and a plurality of events associated with the third steps;
generate a first matrix representing the first steps and transitions to the second steps from the first set of event sequence data, the first matrix comprising a first plurality of graphical node elements representing the plurality of events associated with the first steps in rows of the first matrix, a second plurality of graphical node elements representing the plurality of events associated with the second steps in columns of the first matrix, and a first plurality of graphical link elements, wherein each of the first plurality of graphical link elements represents a transition from an event in a first step represented by a graphical node element in a row of the first matrix to an event in a second step represented by a graphical node element in a column of the first matrix and is positioned at an intersection of the row the first matrix and the column of the first matrix; and
concatenate a second matrix representing the second steps and transitions to the third steps from the first set of event sequence data to the first matrix in a zig-zag pattern by using the second plurality of graphical node elements representing the plurality of events associated with the second steps as columns for the second matrix and providing the second matrix with a third plurality of graphical node elements representing the plurality of events associated with the third steps in rows of the second matrix, the second matrix comprising second plurality of graphical link elements, wherein each of the second plurality of graphical link elements represents a transition from an event in a second step represented by a graphical node element in a column of the second matrix to an event in a third step represented by a graphical node element in a row of the second matrix and is positioned at an intersection of the row of the second matrix and the column of the second matrix.

9. The system as recited in claim 8, wherein the instructions, when executed by the at least one processor, further cause the system to:
identify a plurality of event sequences from a second set of event sequence data, the plurality of event sequences comprising event sequences with first steps, second steps, and third steps;
modify the first matrix to additionally represent the first steps and transitions to the second steps from the second set of event sequence data; and
modify the second matrix to additional represent the second steps and transitions to the third steps from the second set of event sequence data.

10. The system as recited in claim 9, wherein the instructions, when executed by the at least one processor, further cause the system to modify the graphical link elements and the graphical node elements using a diverting color scheme that uses a first color to represent the first set of event sequence data and a second color to represent the second set of event sequence data.

11. The system as recited in claim 10, wherein the instructions, when executed by the at least one processor, further cause the system to modify the graphical link elements and the graphical node elements using a color-scale to represent relative difference and percentage difference.

12. The system as recited in claim 11, wherein the instructions, when executed by the at least one processor, further cause the system to modify sizes of the graphical link elements and the graphical node elements to represent average volume.

13. In a digital medium environment for presenting an interactive analysis of website clickstream data, a method of providing a visualization of one or more sets of clickstream data comprising:
identifying, by at least one processor, a first set of clickstream data for a website and a second set of clickstream data for the website;
generating, by the at least one processor, a first matrix representing first steps and transitions to second steps from both the first and second sets of clickstream data for the website, the first matrix comprising a first plurality of graphical node elements representing a plurality of events associated with the first steps aligned with rows of the first matrix and a second plurality of graphical node elements representing the plurality of events associated with the second steps aligned with columns of the first matrix;

concatenating, by the at least one processor, a second matrix representing the second steps and transitions to third steps from both the first and second sets of clickstream data for the website to the first matrix in a zig-zag pattern by using the second plurality of graphical node elements representing the plurality of events associated with the second steps as columns for the second matrix and providing the second matrix with a third plurality of graphical node elements representing the plurality of events associated with the third steps in rows of the second matrix; and modifying, by the at least one processor, a characteristic of the first plurality of graphical node elements, the second plurality of graphical node elements, and the third plurality of graphical node elements to indicate web traffic from the first set of clickstream data and web traffic from the second set of clickstream data.

14. The method as recited in claim 13, further comprising:
placing the first plurality of graphical node elements on a first side of the first matrix as row headers;
placing event descriptions on a second opposing side of the first matrix, the event descriptions providing an indication of events associated with each of the first steps represented by the first plurality of graphical node elements;
placing the first plurality of graphical node elements on a third side of the first matrix and on a first side of the second matrix as column headers for both the first matrix and the second matrix; and
placing event descriptions on a second opposing side of the second matrix, the event descriptions providing an indication of events associated with each of the second steps represented by the first plurality of graphical node elements.

15. The method as recited in claim 13, further comprising:
sizing each graphical node element of the first plurality of graphical node elements to indicate a first volume of web traffic of the associated first steps of both the first and second sets of clickstream data; and
sizing each graphical node elements of the second plurality of graphical node elements to indicate a second volume of web traffic of the associated second steps of both the first and second sets of clickstream data.

16. The method as recited in claim 13, further comprising:
providing a first plurality of graphical link elements in the first matrix, wherein each of the first plurality of graphical link elements represents a transition from an event in a first step represented by a graphical node element in a row of the first matrix to an event in a second step represented by a graphical node element in a column of the first matrix and is positioned at an intersection of the row the first matrix and the column of the first matrix; and
providing a second plurality of graphical link elements in the second matrix, wherein each of the second plurality of graphical link elements represents a transition from an event in a second step represented by a graphical node element in a column of the second matrix to an event in a third step represented by a graphical node element in a row of the second matrix and is positioned at an intersection of the row of the second matrix and the column of the second matrix.

17. The method as recited in claim 16, wherein modifying the characteristic of the first plurality of graphical node elements, the second plurality of graphical node elements, and the third plurality of graphical node elements to indicate web traffic from the first set of clickstream data and web traffic from the second set of clickstream data comprises associated a first color with the first set of clickstream data and a second color with the second set of clickstream data and adjusting a hue of the graphical node elements to indicate a relative difference between the web traffic from the first set of clickstream data and the web traffic from the second set of clickstream data.

18. The method as recited in claim 13, further comprising:
detecting a selection of a graphical node element of the first plurality of graphical node elements in the first matrix; and
highlighting paths from the selected graphical node element to graphical node elements of the second plurality of graphical node elements associated with events performed after first performing the event associated with the selected graphical node element, the paths indicating paths of visitors through the website that started at a webpage associated with the selected graphical node element.

19. The method as recited in claim 18, further comprising adding an indicator representing path-specific web traffic volume to the graphical node elements of the second plurality of graphical node elements compared to overall web traffic volume to the graphical node elements of the second plurality of graphical node elements.

20. The method as recited in claim 13, wherein the first set of clickstream data represents web traffic to the website during a first period of time and the second set of clickstream data represents web traffic to the website during a second period of time differing from the first period of time.

* * * * *